June 21, 1960 W. M. POTTS ET AL 2,941,340
CARTON-FORMING AND CLOSING MEANS AND METHOD
Filed April 19, 1957 18 Sheets-Sheet 3
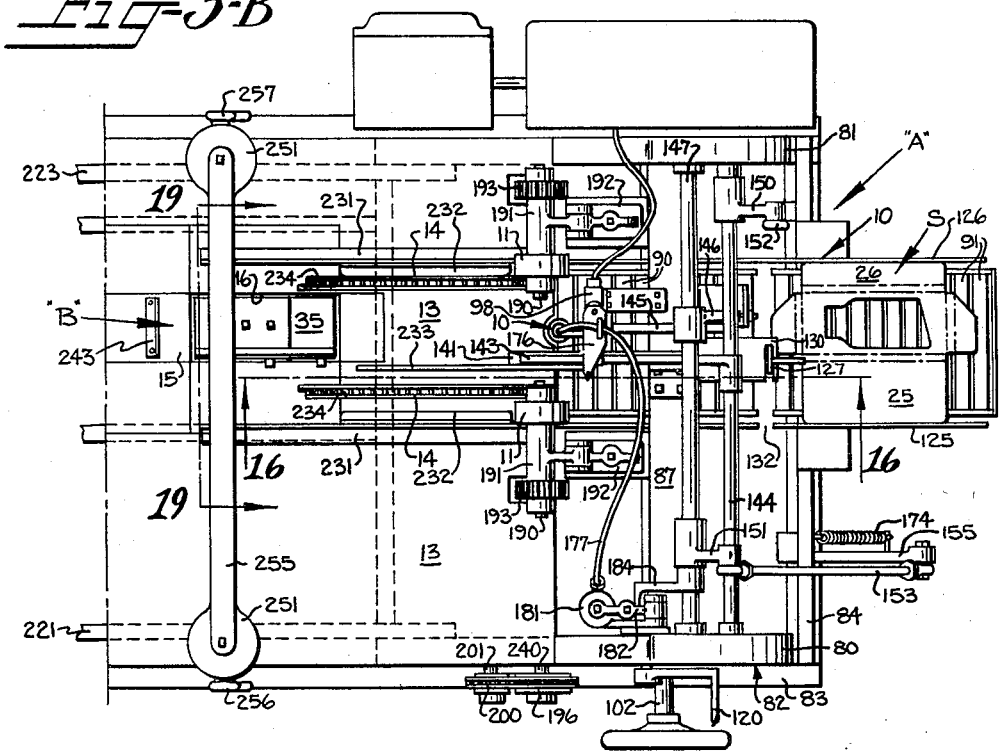
Fig-3-B
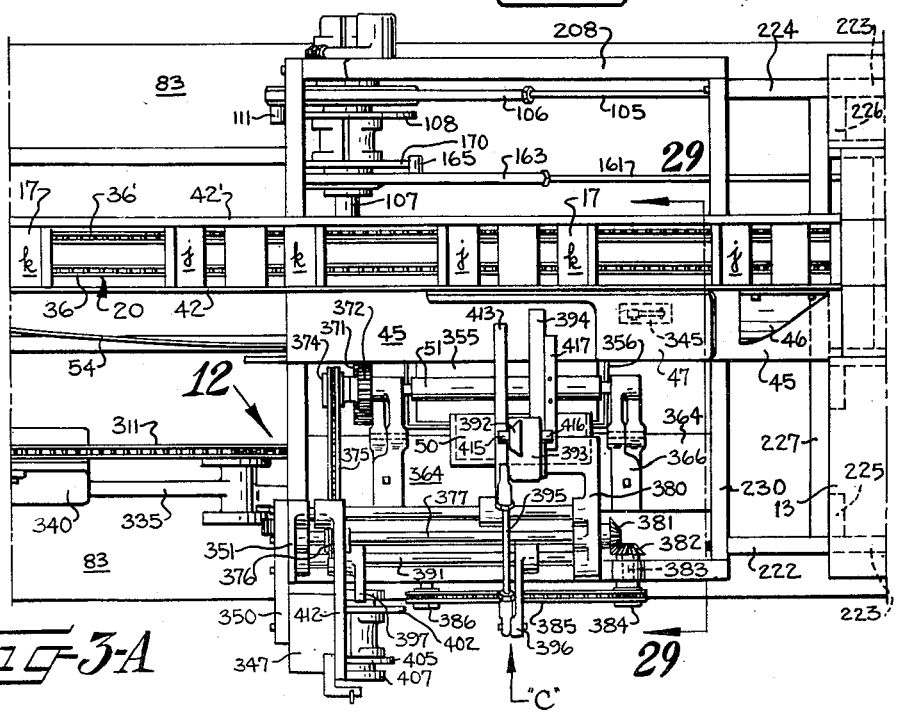
Fig-3-A

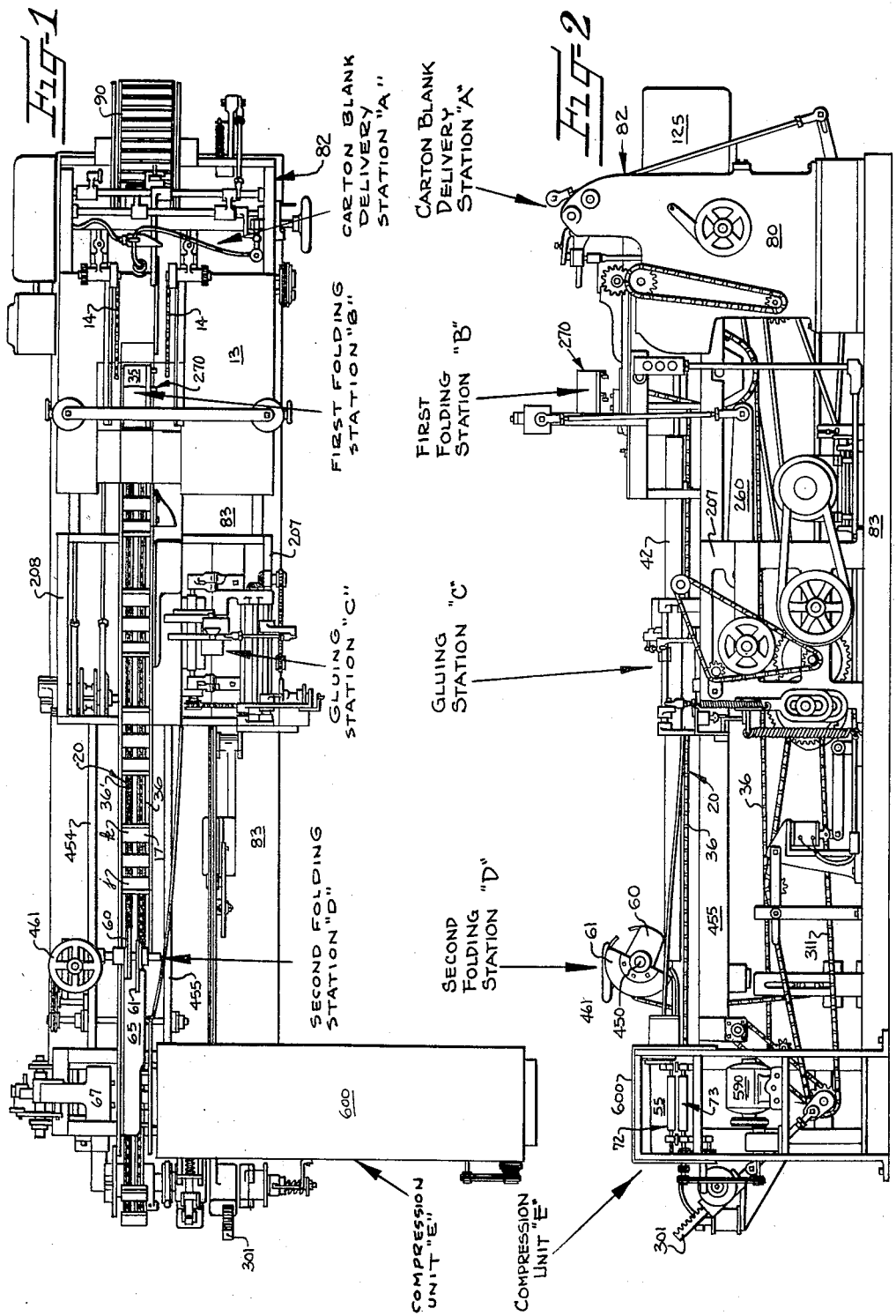

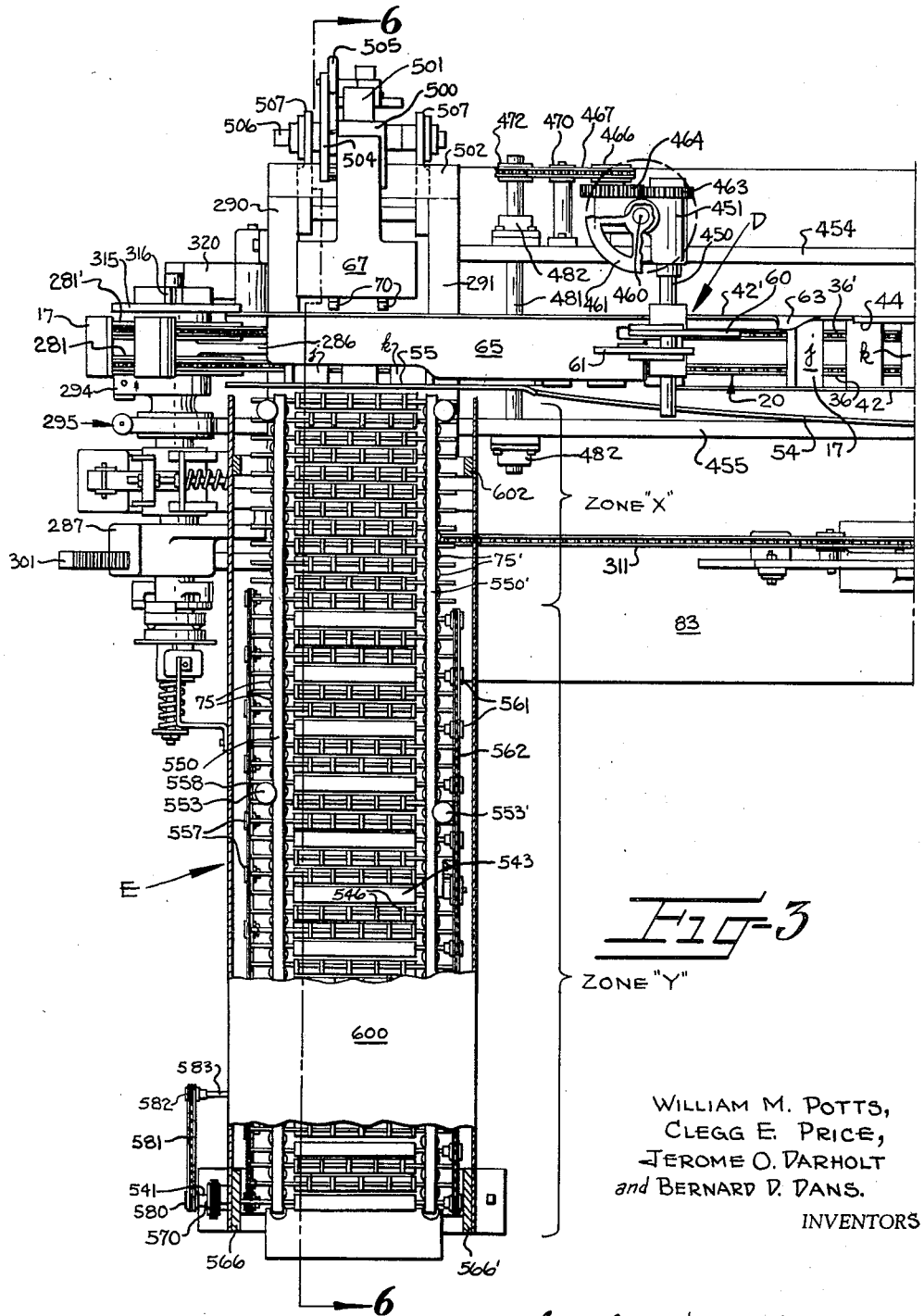

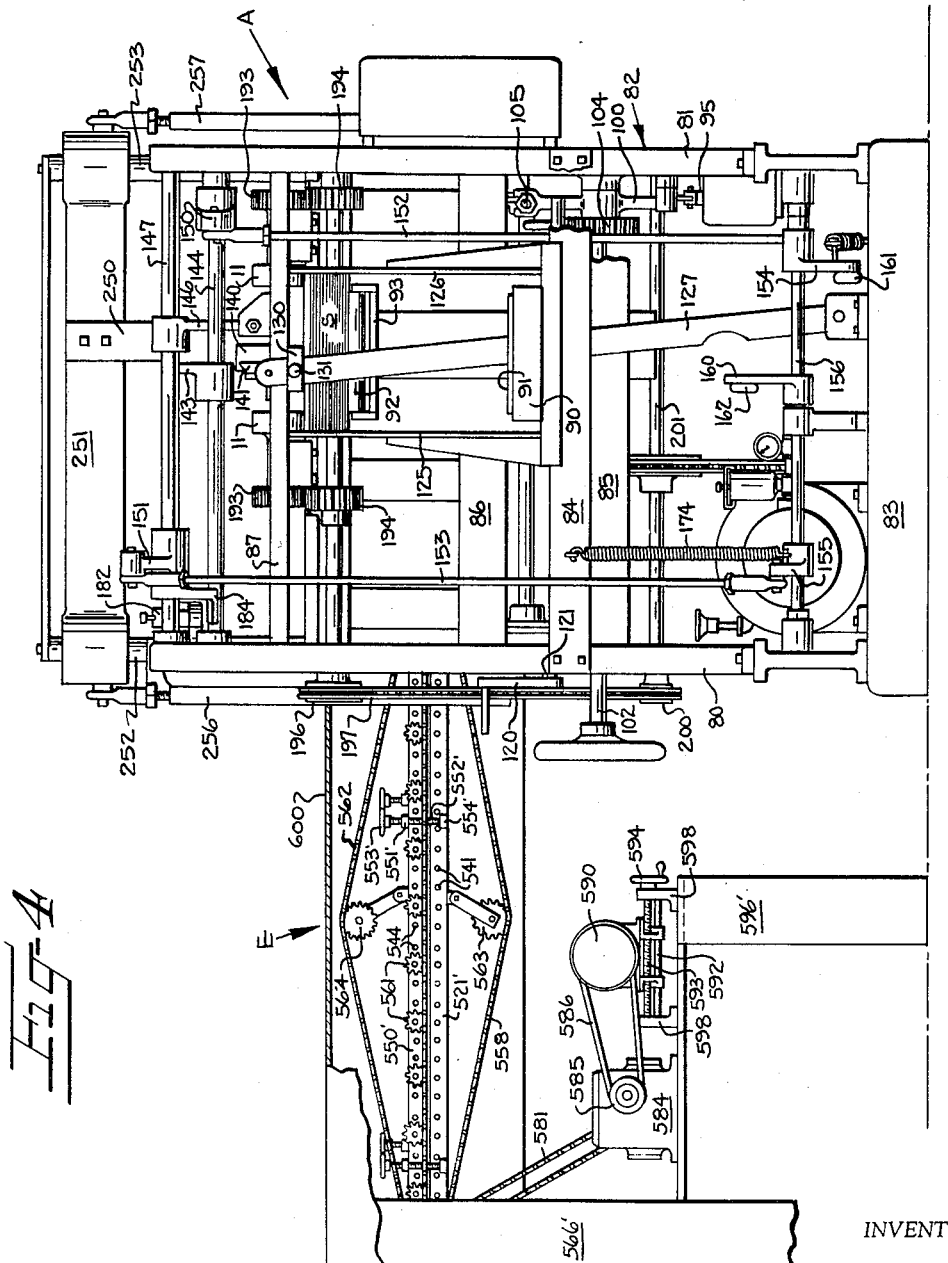

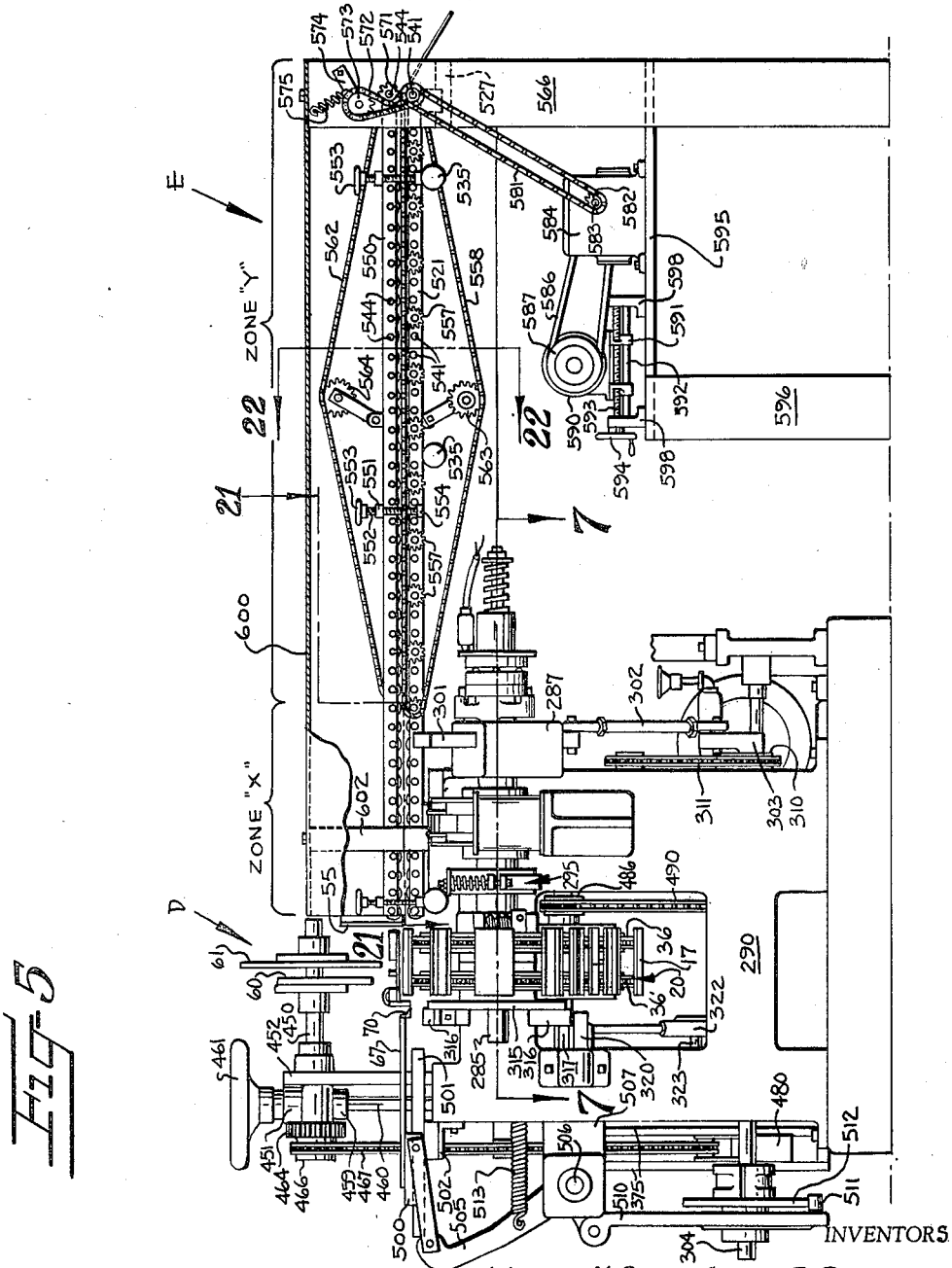

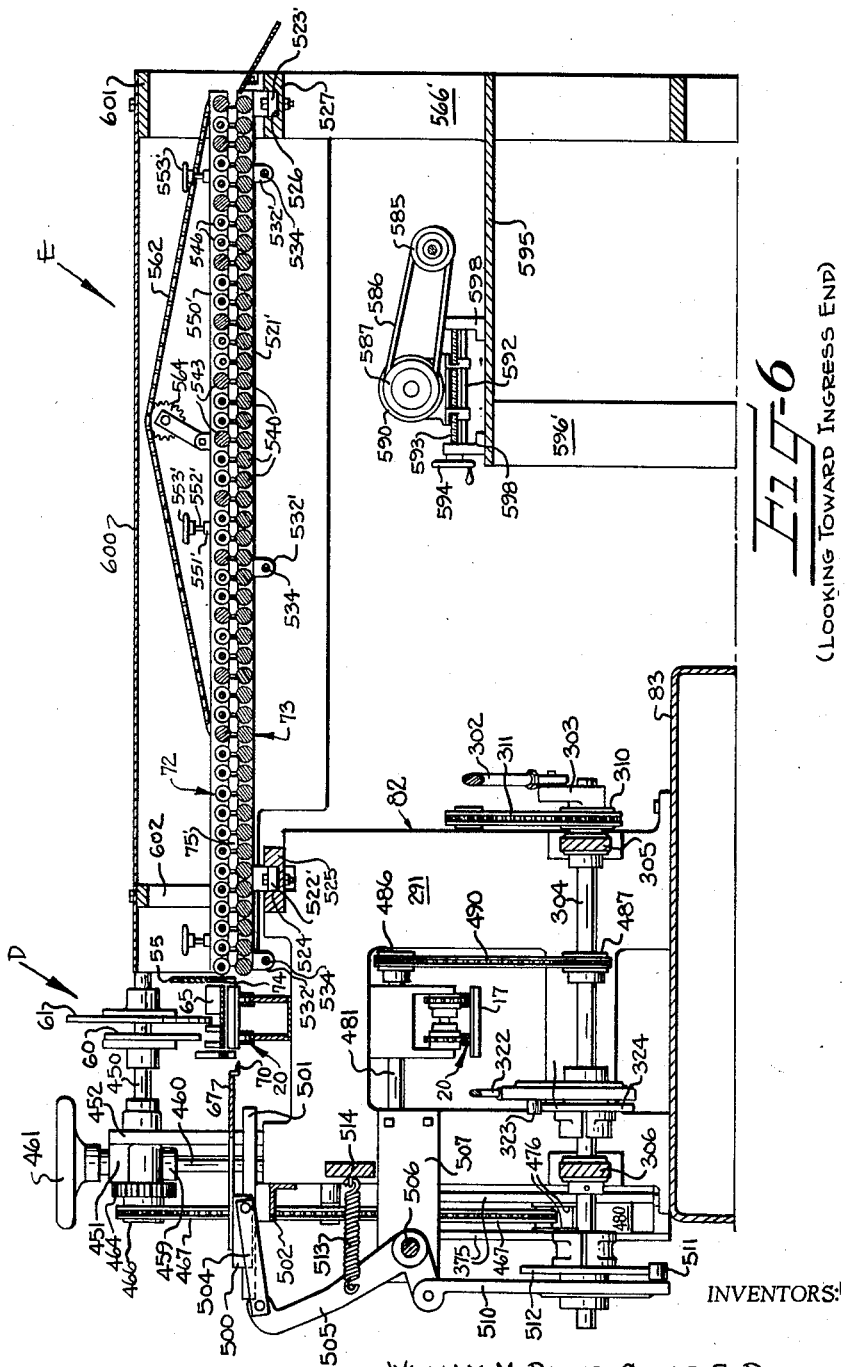

INVENTORS
WILLIAM M. POTTS, CLEGG E. PRICE,
JEROME O. DARHOLT and BERNARD P. DANS.

BY Eaton, Bell, Hunt + Seltzer
ATTORNEYS

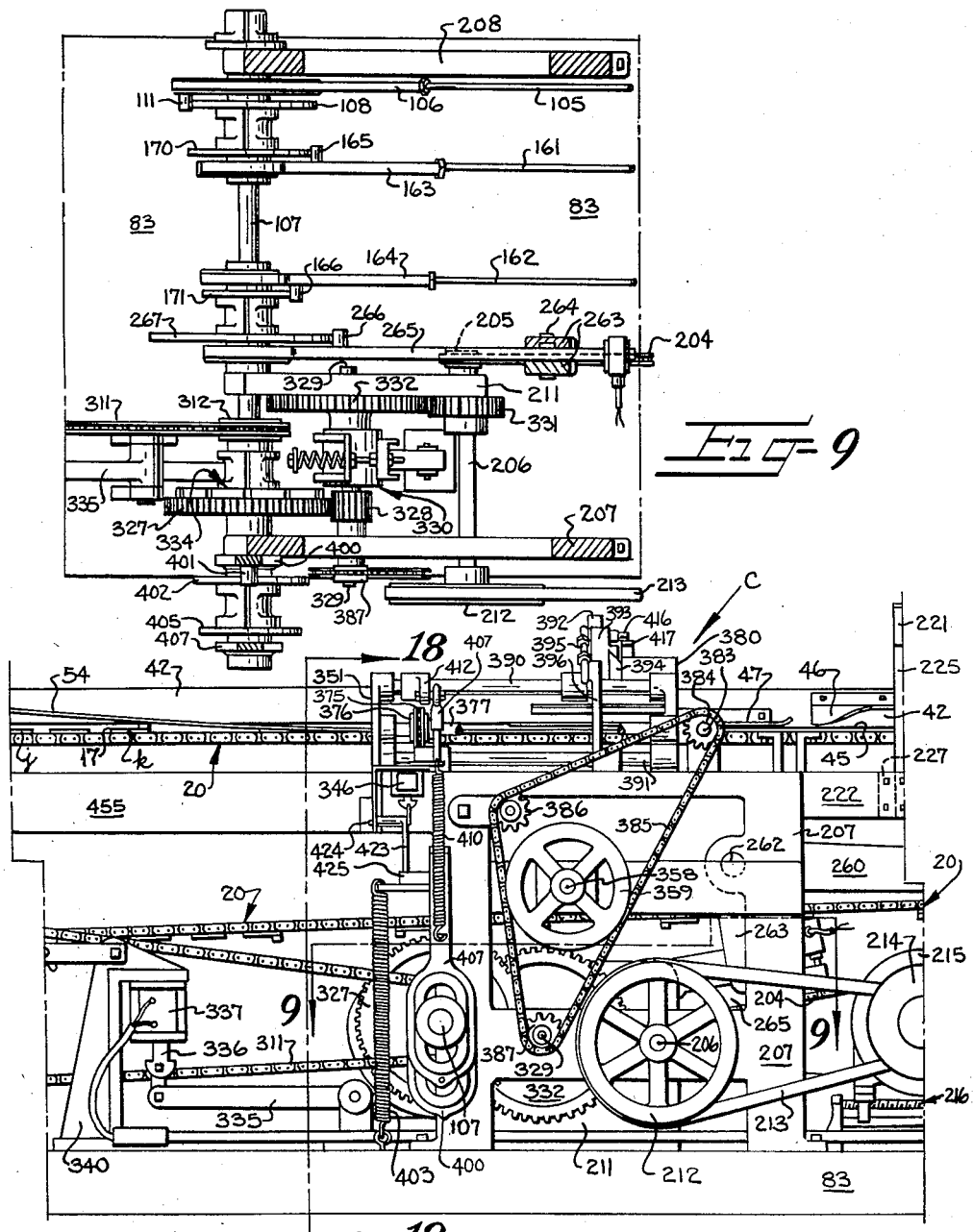

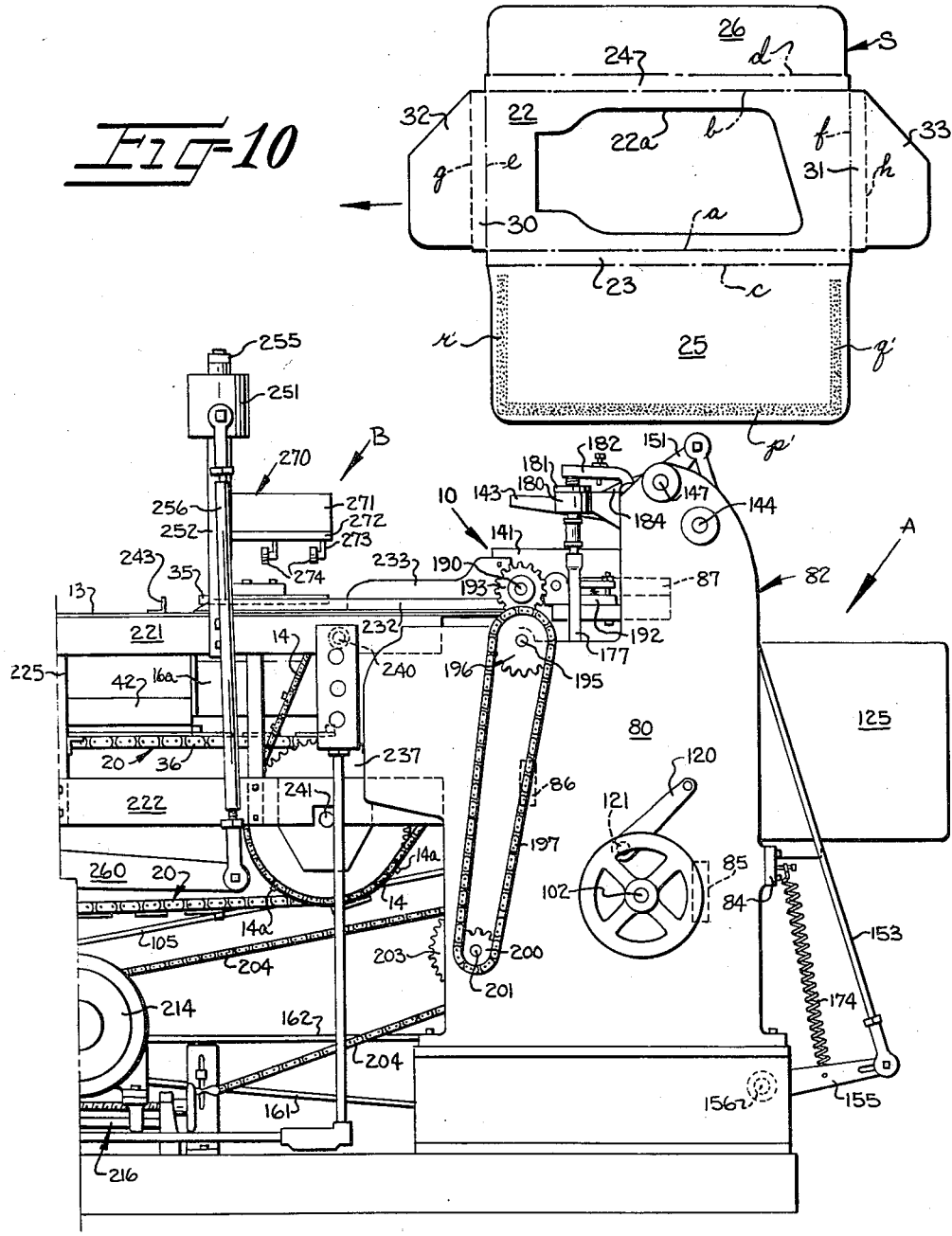

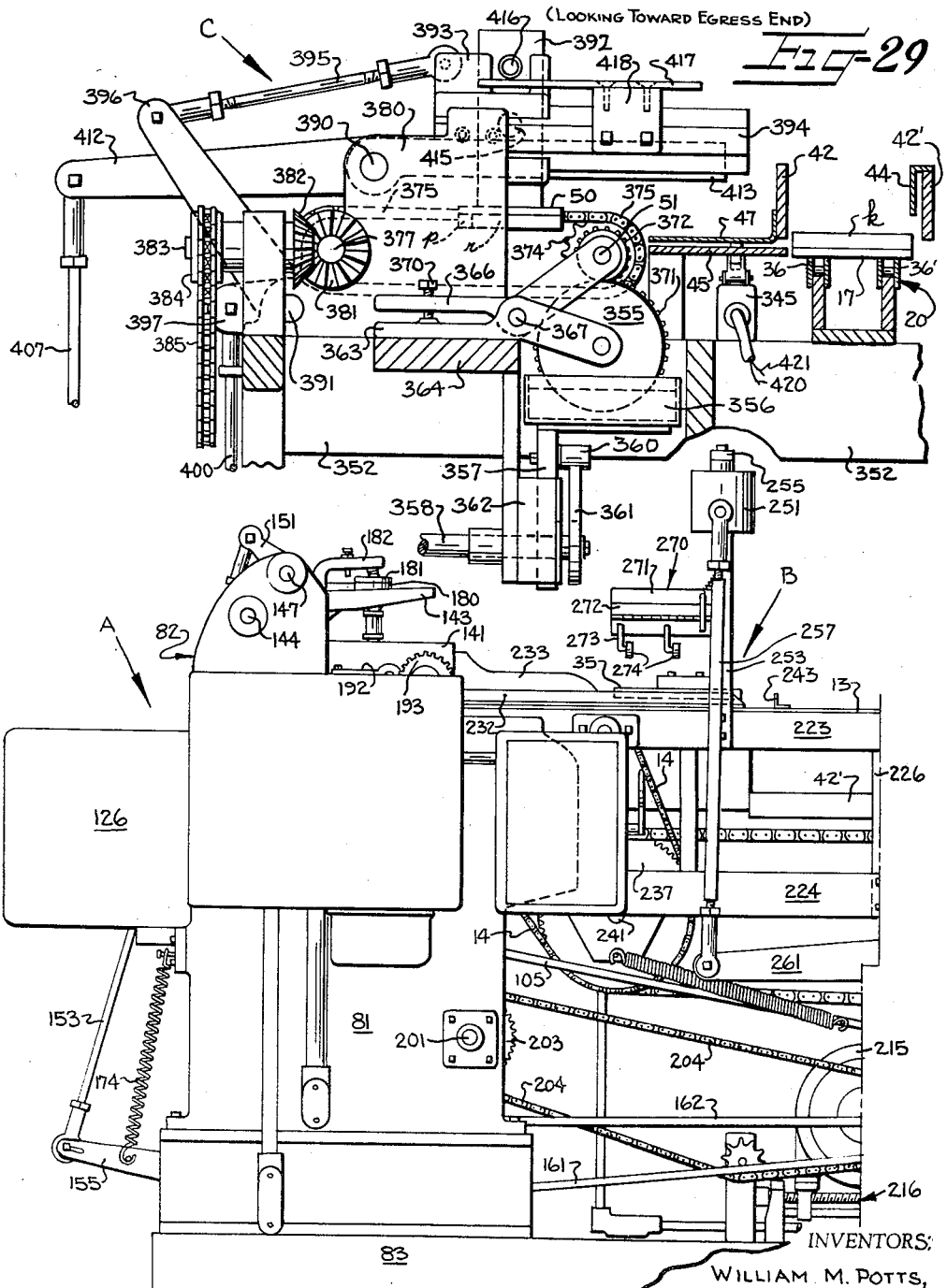

June 21, 1960 W. M. POTTS ET AL 2,941,340
CARTON-FORMING AND CLOSING MEANS AND METHOD
Filed April 19, 1957 18 Sheets-Sheet 11
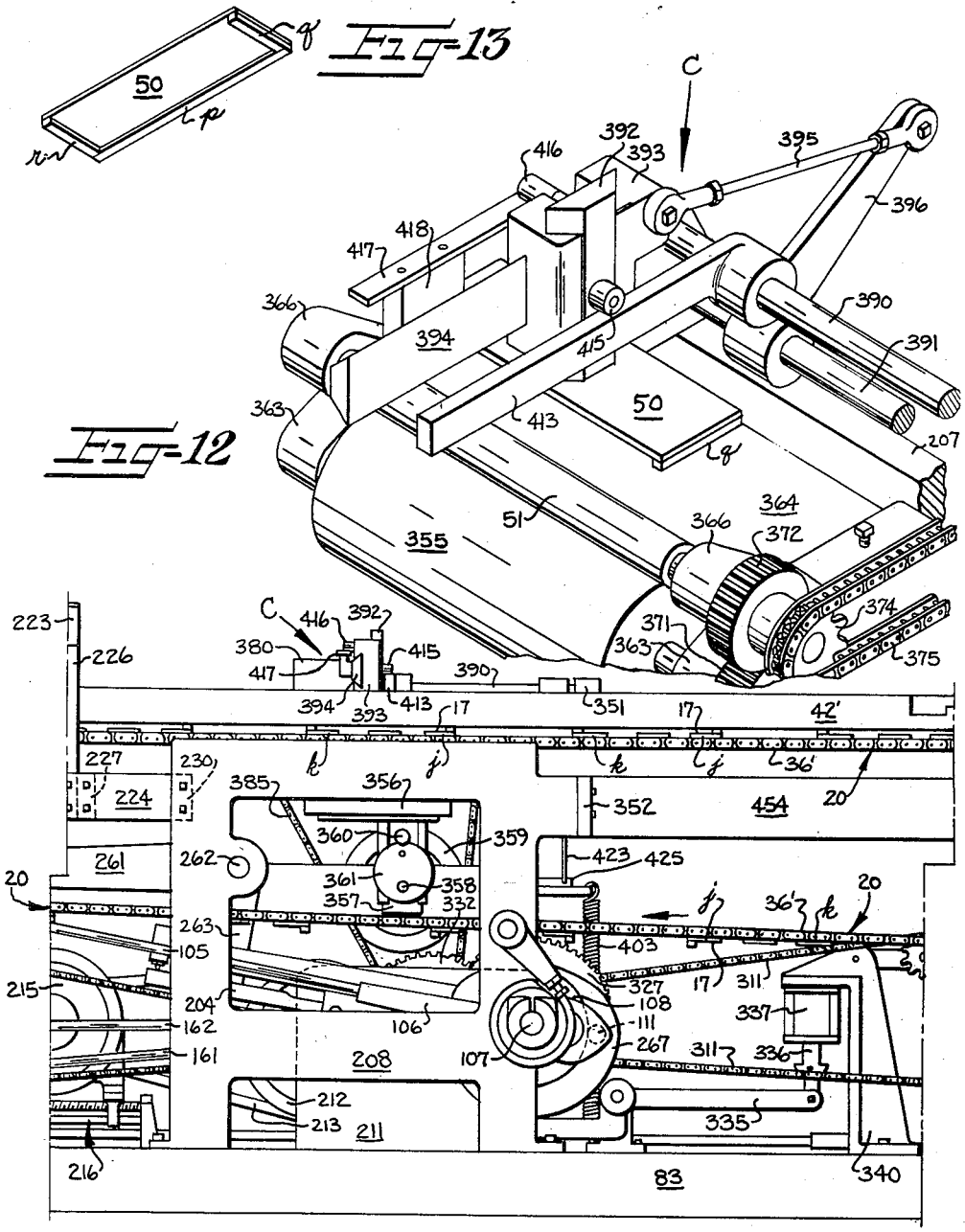
INVENTORS
WILLIAM M. POTTS, CLEGG E. PRICE,
JEROME O. VARHOLT and BERNARD V. VANS.
BY Eaton, Bell, Hunt + Seltzer
ATTORNEYS

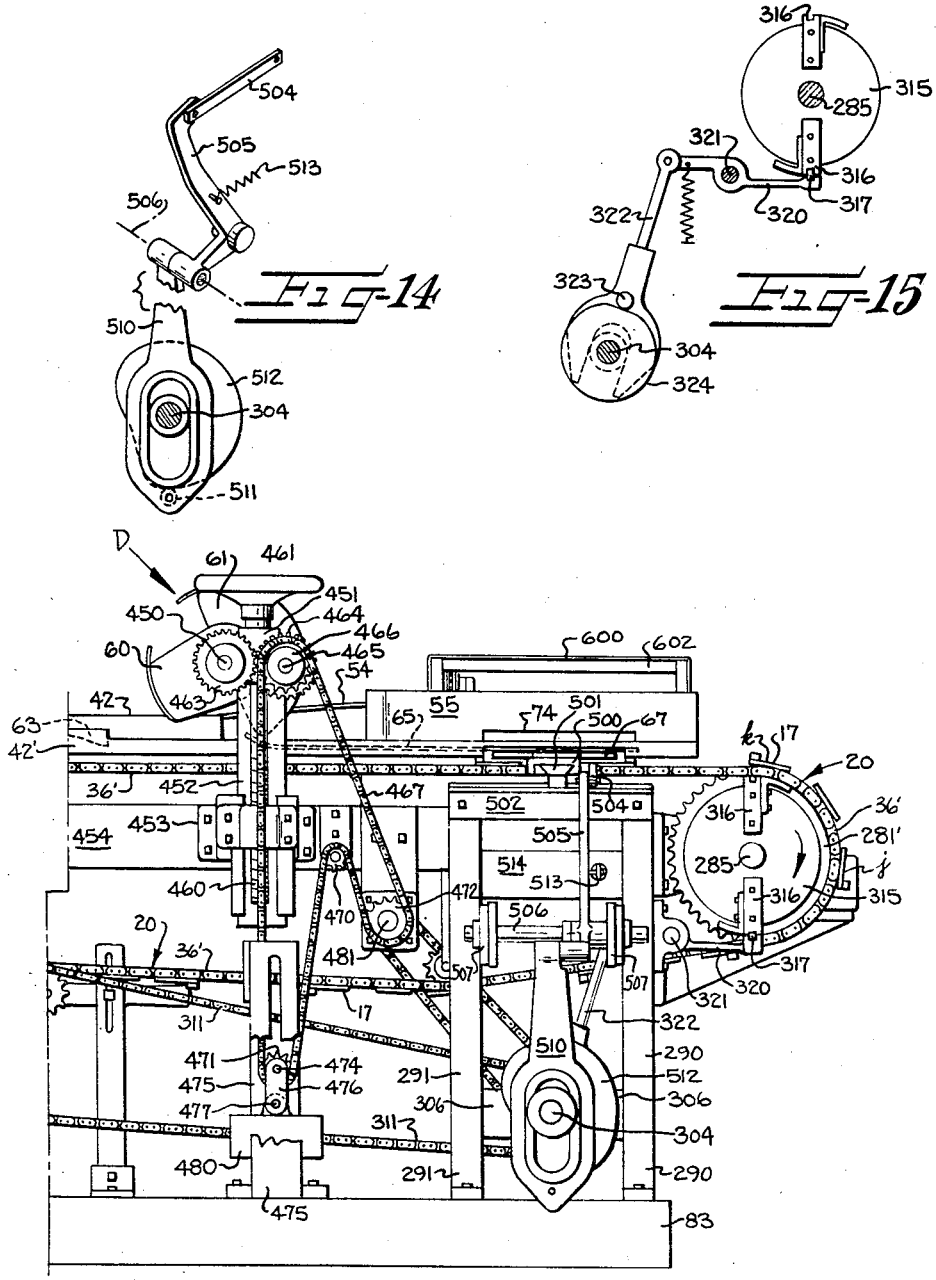

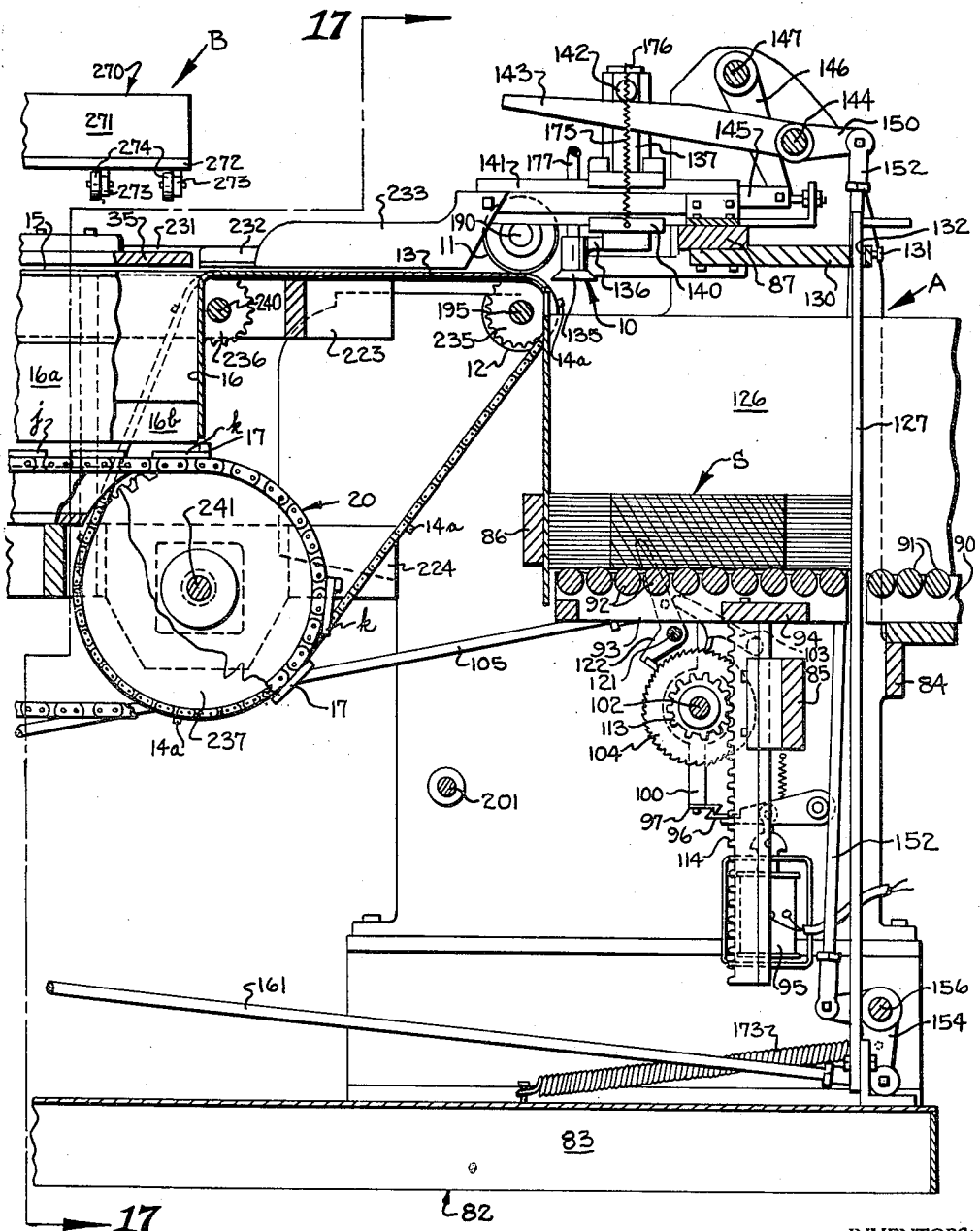

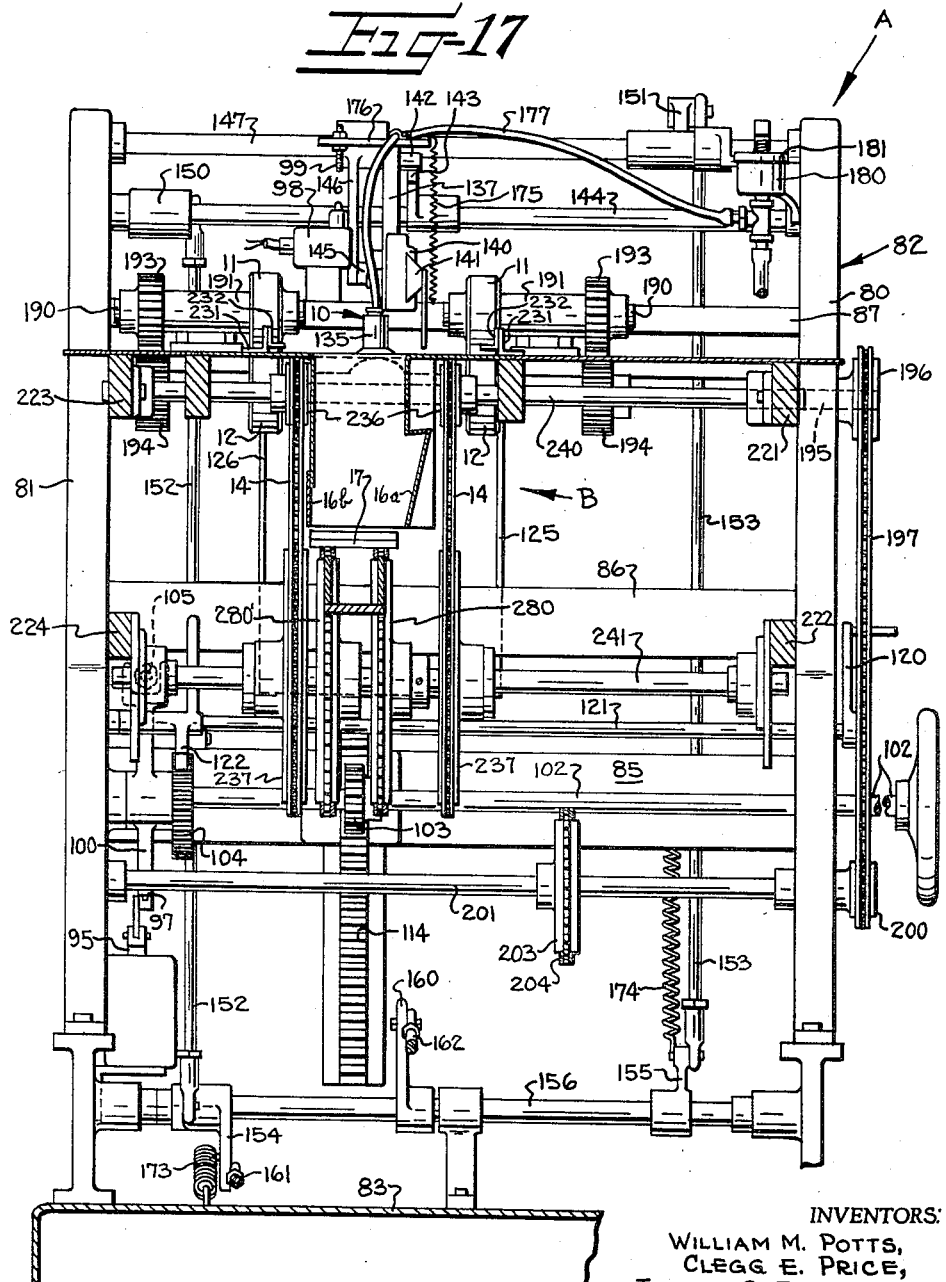

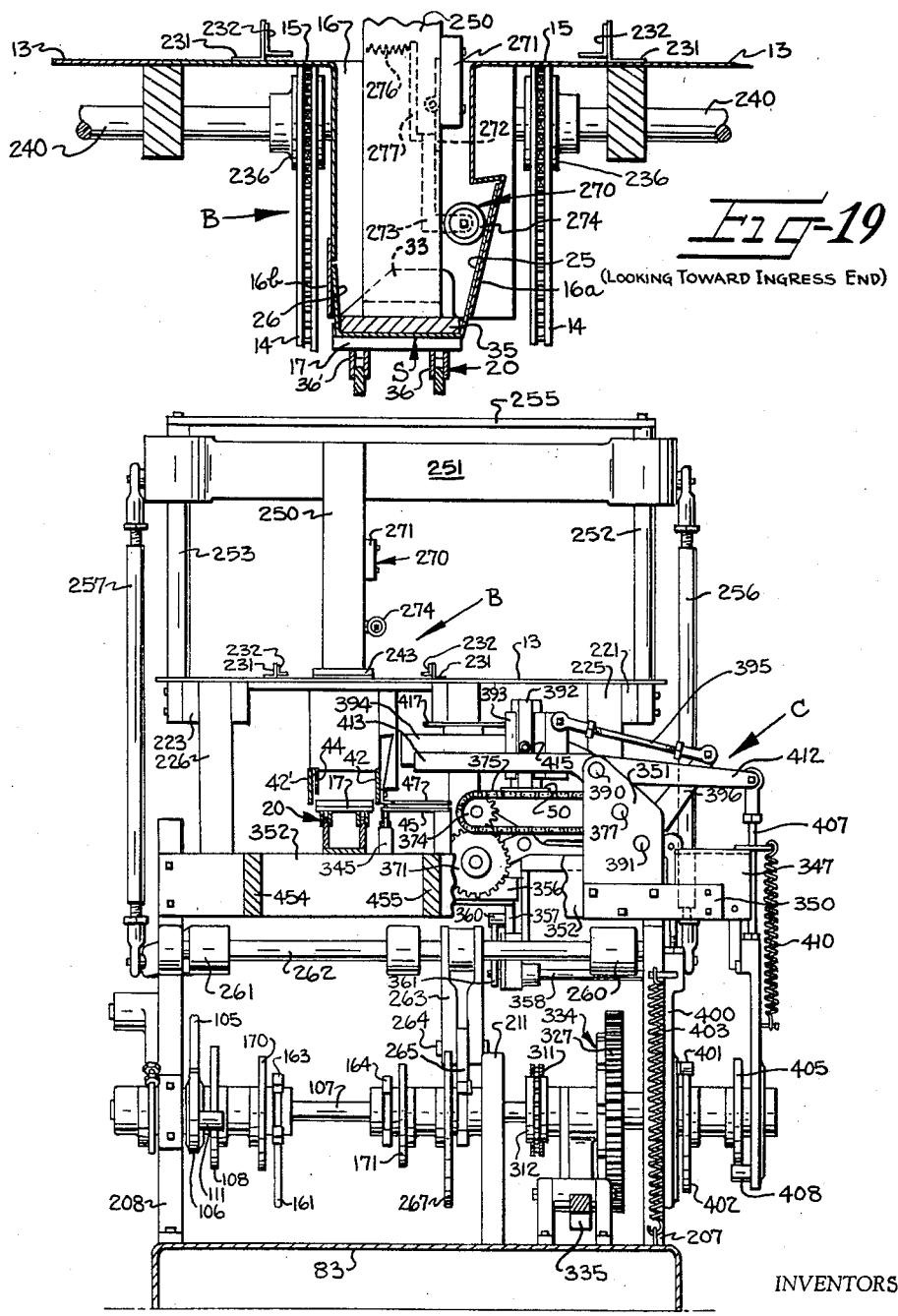

June 21, 1960 W. M. POTTS ET AL 2,941,340
CARTON-FORMING AND CLOSING MEANS AND METHOD
Filed April 19, 1957 18 Sheets-Sheet 16
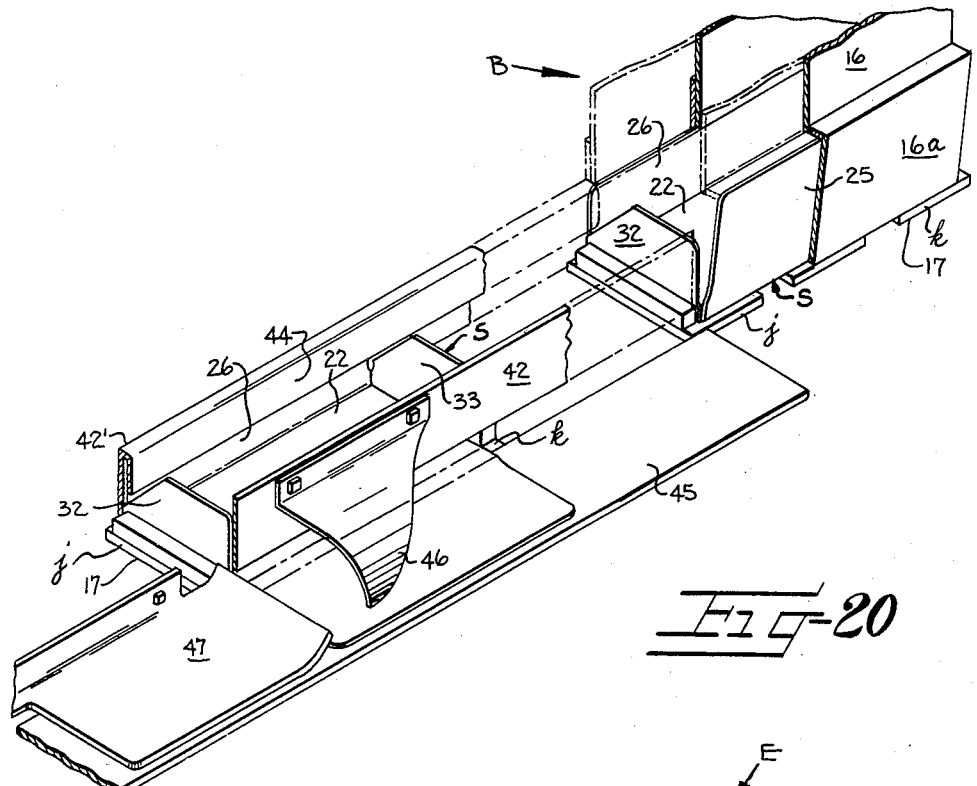
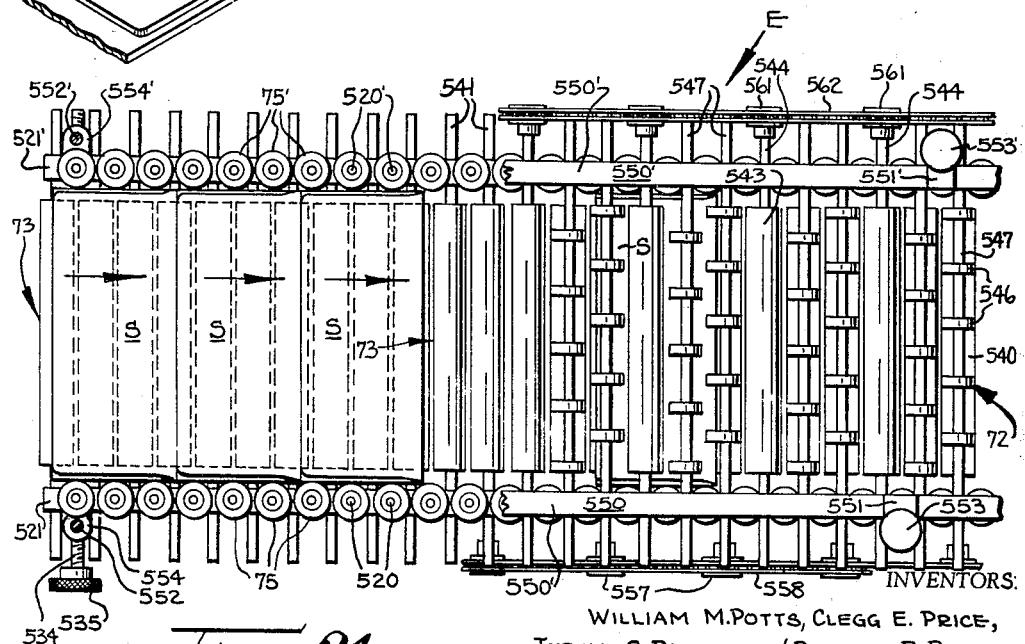
INVENTORS:
WILLIAM M. POTTS, CLEGG E. PRICE,
JEROME O. DARHOLT and BERNARD D. DANS.
BY Eaton, Bell, Hunt & Seltzer
ATTORNEYS

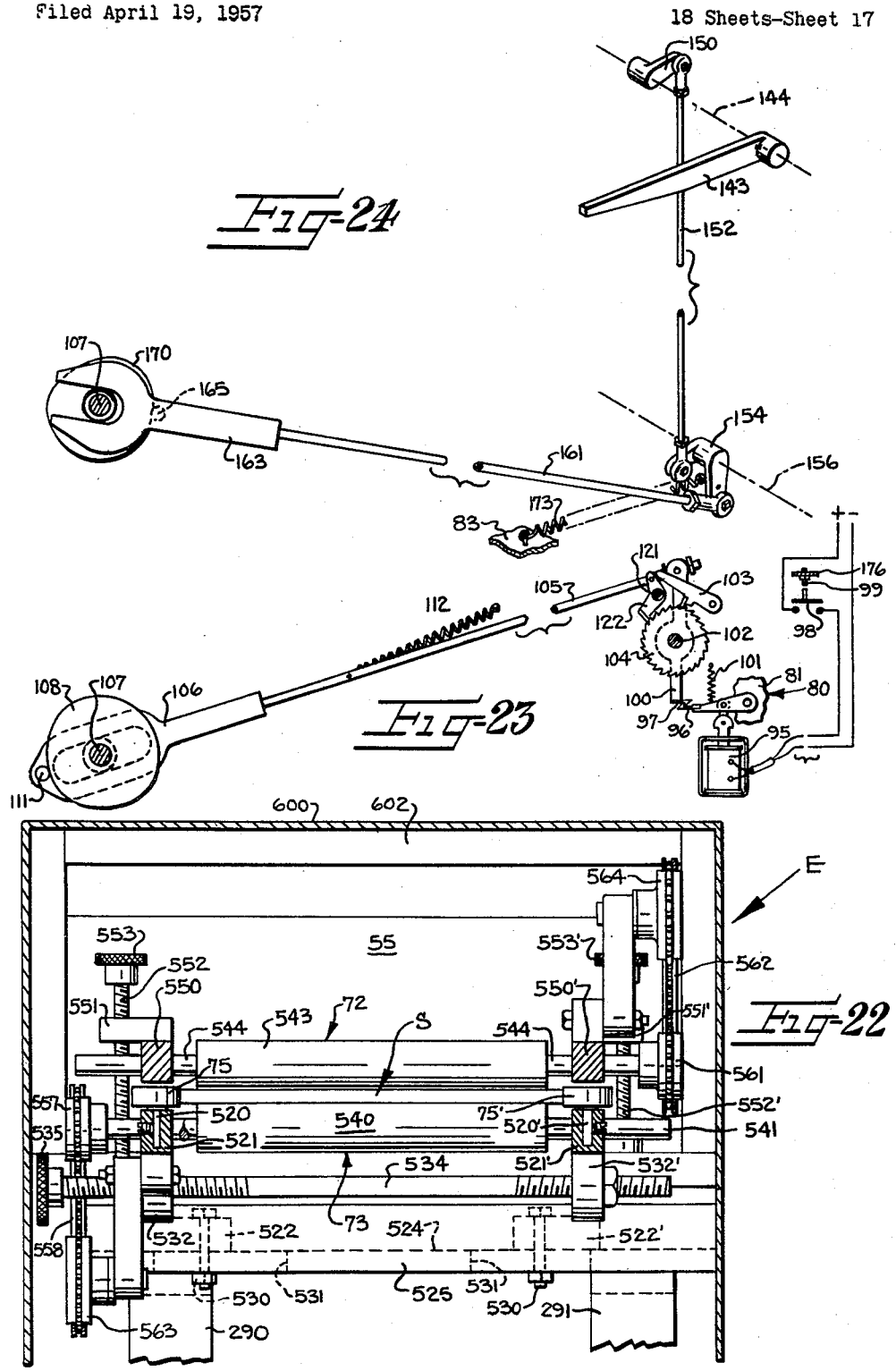

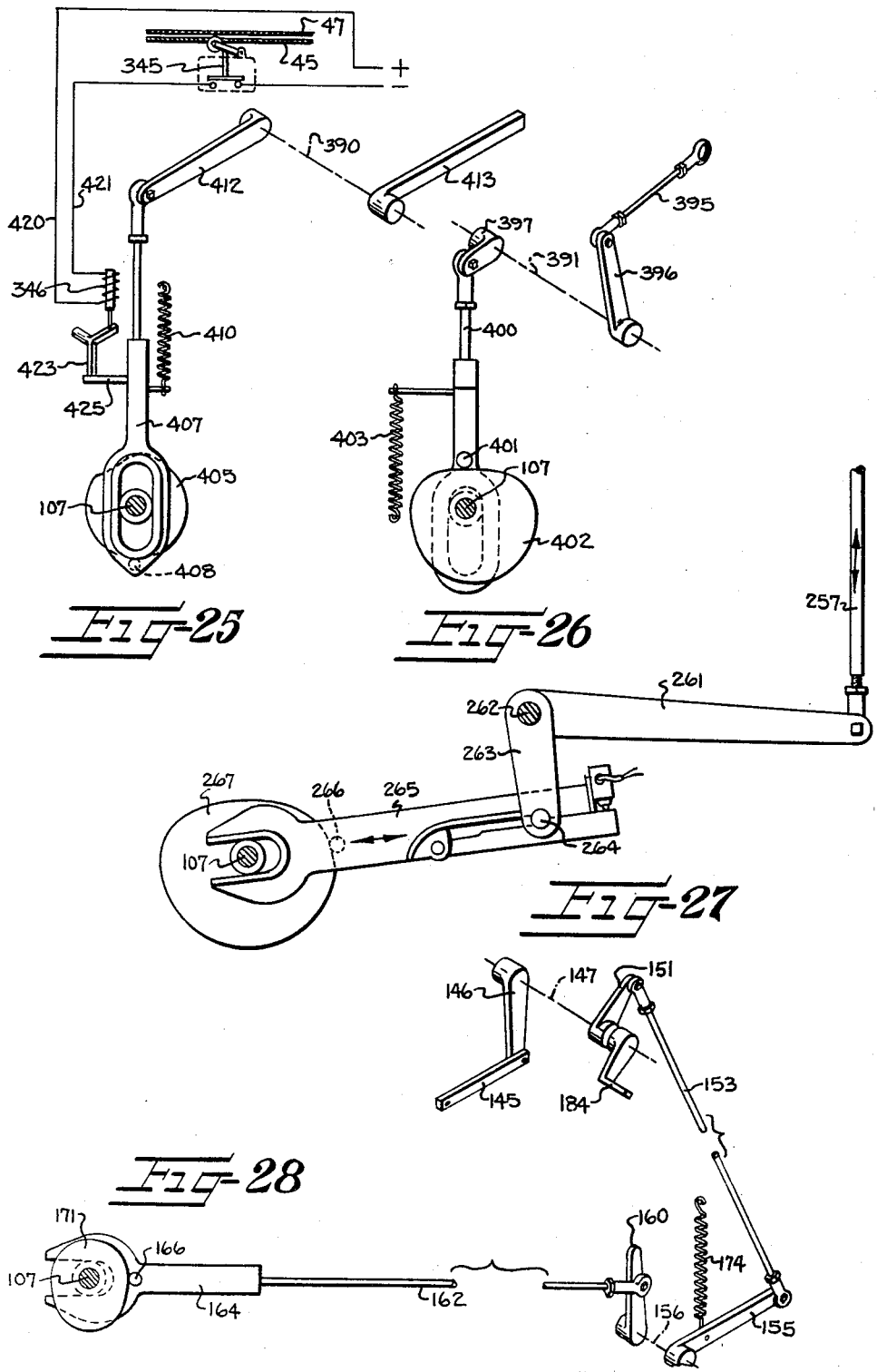

United States Patent Office 2,941,340
Patented June 21, 1960

2,941,340

CARTON-FORMING AND CLOSING MEANS AND METHOD

William M. Potts, Charlotte, Clegg E. Price, Matthews, and Jerome O. Darholt and Bernard D. Dans, Charlotte, N.C., assignors to Dacam Corporation, Charlotte, N.C., a corporation of North Carolina Filed Apr. 19, 1957, Ser. No. 653,795

52 Claims. (Cl. 53—34)

This invention relates to packaging machinery particularly to an improved machine for forming elongated and substantially rectangular cartons or carriers from paperboard or cardboard blanks in which articles, such as men's hose and the like may be placed, after which the cartons are closed.

This invention is particularly concerned with an apparatus of the general character disclosed in the copending application of Grover C. Currie et al., Serial No. 499,652, filed April 6, 1955, and entitled Carton Forming Apparatus and Method, now U.S. Patent No. 2,893,183.

It is an object of this invention to provide apparatus of the character described in which a novel blank delivery station, a novel gluing or adhesive-applying station and a novel compression unit for applying pressure to completed cartons are uniquely arranged with first and second folding stations of the general character disclosed in said copending application, the blank delivery station, first folding station, adhesive applying or gluing station, second folding station and compression station being serially arranged in that order. The novel blank delivery station, gluing station and compression station or unit combined with the first and second folding stations facilitates a much higher rate of production than has heretofore been possible with similar machines, particularly machines of the type disclosed in said copending application.

In the present apparatus, the aforesaid stations are serially arranged so that successive blanks are initially delivered at the delivery station, then partially folded at the first folding station to form an open-topped carton with side flaps distended so articles may be manually positioned in each successive carton. Thereafter, the successive partially formed cartons pass through the gluing station which is uniquely arranged so as to apply glue or other adhesive to one of the side flaps of the carton in any desired pattern; that is, the latter flap may be formed with a coating of adhesive along opposite side edges and one free end thereof or in any other desired manner.

After the cartons advance past the gluing station, they pass through the second folding station for successively folding opposite end flaps thereof inwardly over one of the side flaps and then folding the other side flap over the first side flap and the end flaps. The cartons are then ejected from the conveyor (which has advanced successive cartons from the first folding station through the second folding station) and moved between upper and lower series of rollers comprising the compression unit or station. In order that the filled and completed cartons are properly shaped; i.e. so that adjacent end and side edges are relatively perpendicular, the first few rollers of each series are idler rollers so that each successive carton is ejected against the previously formed carton and, as the leading carton is thus advanced through the compression unit, it then passes between other rollers of said series, some of which are driven to ultimately space successive cartons apart from each other while applying pressure to the upper and lower surfaces thereof to insure that the various complementary elements of each carton are tightly secured together.

Some of the objects of the invention having been stated, other and more detailed objects of the invention will appear as the description proceeds when taken in connection with the accompanying drawings, in which:

Figure 1 is a top plan view of the improved packaging machine;

Figure 2 is a left-hand side elevation of the machine with respect to the direction of the movement of the cartons;

Figure 7:
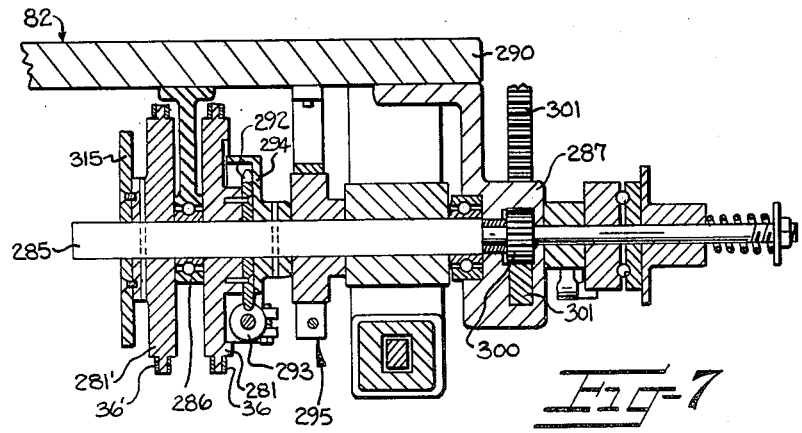
Figure 8:
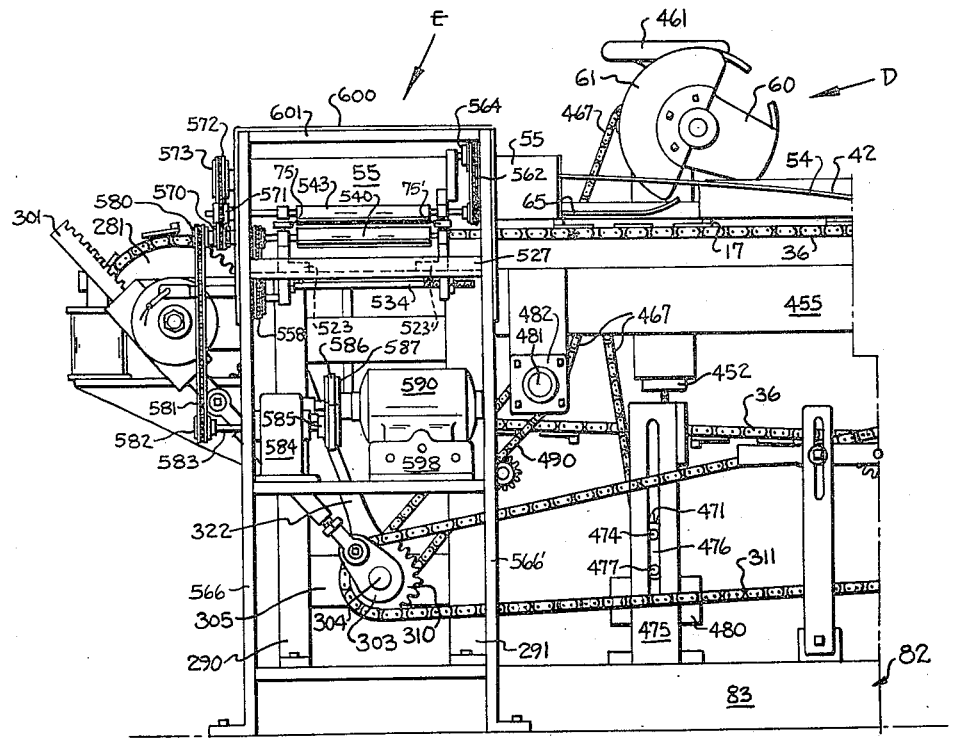

Figures 3, 3–A and 3–B are enlarged plan views of the respective left-hand, central and right-hand portions of Figure 1, illustrating the carton ejecting end, the gluing station and the feed end, respectively, of the machine;

Figure 4 is an enlarged elevation of the feed end of the machine looking at the right-hand side of Figures 1 and 2;

Figure 5 is a discharge end view of the machine with the cover of the compression unit broken away and looking at the left-hand side of Figures 1, 2 and 3;

Figure 6 is a longitudinal, vertical sectional view through the compression unit, this view being transverse to the longitudinal axis of the machine proper, taken substantially along line 6—6 in Figure 3;

Figure 7 is an enlarged fragmentary sectional plan view showing parts of the means for imparting intermittent movement to the main conveyor;

Figures 8, 8–A and 8–B are, collectively, an enlarged left-hand side elevation of the machine as shown in Figure 2;

Figure 9 (Sheet 8) is a fragmentary top plan view looking substantially along line 9—9 in Figure 8–A illustrating means for driving the main cam shaft of the machine.

Figure 10 (Sheet 9) is a plan view of a blank from which one of the cartons is formed in the present machine;

Figures 11, 11–A and 11–B are, collectively, an enlarged right-hand side elevation of the machine looking at the opposite side thereof from that shown in Figure 2;

Figure 12 (Sheet 11) is a fragmentary isometric view of some of the assembled parts of the gluing station looking in the general direction of the arrow indicated at 12 in Figure 3–A;

Figure 13 is an isometric view looking generally in the direction of the arrow indicated at 13 in Figure 12 and showing a preferred arrangement of the ribs on the glue-applying plate;

Figures 14 and 15 (Sheet 12) are somewhat schematic views of the cams and corresponding mechanical connections for operating the carton-ejector means at the discharge end of the machine and the blank transferring means at the ingress or feed end of the machine, respectively;

Figure 16 is an enlarged longitudinal vertical sectional view through the feed end of the machine taken substantially along line 16—16 in Figure 3–B;

Figure 17 is a transverse vertical sectional view, mostly in elevation, looking toward the ingress end of the machine substantially along line 17—17 in Figure 16;

Figure 18 is a transverse vertical sectional view showing the gluing station, being taken substantially along line 18—18 in Figure 8–A and looking toward the ingress end of the machine;

Figure 19 is an enlarged fragmentary transverse vertical sectional view through the die through which each successive blank is forced in the initial carton-forming operation and being taken substantially along line 19—19 in Figure 3–B;

Figure 20 is a somewhat schematic isometric view of a feed-end portion of the track through which each successive carton passes and showing portions of the carton-forming die and the means for horizontally distending outwardly one of the side flaps of each successive carton;

Figure 21 is an enlarged fragmentary plan view showing the ingress end of the compression unit, taken substantially along the line 21—21 in Figure 5, but omitting the cover;

Figure 22 is an enlarged transverse vertical sectional view through the compression unit, being parallel to the longitudinal axis of the machine proper, taken substantially along line 22—22 in Figure 5;

Figures 23 through 28 are somewhat schematic views of the connections between various cams of the machine and elements controlled thereby;

Figure 29 (Sheet 10) is a fragmentary transverse vertical sectional view, mostly in elevation, taken substantially along line 29—29 in Figure 3-A (Sheet 3), illustrating the adhesive-applying apparatus.

Brief synopsis of the machine

The improved machine is particularly devised for feeding flat paperboard or cardboard carton blanks or carrier blanks, broadly designated at S (Figures 3-B, 10 and 16), wherein a blank storing and feeding mechanism broadly designated at 10 and comprising a blank delivery station A, as legended in Figures 1 and 2, picks up the uppermost blank S from a stack (Figure 16) and then moves forwardly to position the leading edge of the blank at the nip of upper and lower pairs of constantly driven feed rolls 11, 12 (Figures 3-B, 4, 16 and 17). The feed rolls 11, 12 feed each successive blank S onto a plate 13, immediately below the level of which a pair of laterally spaced, constantly driven and endless parallel blank transferring or feeding elements 14 are located, these elements being shown in the form of sprocket chains in Figures 3-B, 4, 11, 16 and 17.

Each of the endless blank transferring sprocket chains 14 has one or more lugs or projections 14a thereon which, when moving with the upper runs of the chains 14, project slightly above the level of the plate 13 so as to engage the rear edge of each successive carton blank S to feed the same onto a die platform 15 (Figures 3-B, 16, 17 and 19) provided with a substantially rectangular tubular die 16 which is opened at its upper end and whose lower end terminates closely above the path of travel of pockets 17 mounted on an intermittently movable main conveyor broadly designated at 20. The platform 15 and die 16 are elements of a first folding station B (Figures 1 and 2).

The carton blank

In order to facilitate the various steps in the operation of the improved machine the carton blank S is preferably constructed in a manner to be presently described (Figure 10). The blank S comprises a main body or bottom 22 which is preferably provided with an opening 22a therein for the purpose of displaying the article subsequently to be placed in the cartons formed from the blanks S. The bottom 22 is provided with relatively narrow opposite side walls 23, 24 whose proximal edges are defined by respective longitudinally extending score or crease lines a, b.

A relatively wide side overlap or top wall 25 and a relatively narrow or short side flap 26 extend outwardly from the side walls 23, 24. Suitable score or crease lines c, d are also formed at the junctures of the side walls 23, 24 with the respective flaps 25, 26. The body or bottom 22 also has relatively narrow end walls 30, 31 connected to opposite ends thereof and defined by score or crease lines e, f and the outer ends of the end walls 30, 31 have respective end flaps 32, 33 thereon defined by score or crease lines g, h.

Now, it will be noted that, as each successive blank S is positioned upon the die platform 15 (Figure 19) a prefold block or punch 35, normally spaced above the level of the die plate or platform 15, moves downwardly to press the bottom 22 of the corresponding blank S into and through the tubular die 16. The die 16 is of such dimensions as to then cause all the walls 23, 24, 30 and 31, and the respective flaps to be bent upwardly along the respective score lines a, b, e, f. After this operation the blank S is, in fact, a partially formed container, carrier or carton and will be referred to hereinafter as such. The punch 35 forces each successive blank S downwardly through the die 16 and into a corresponding pocket 17 then positioned therebeneath, as heretofore described, and then the punch 35 immediately commences an upward stroke. The main conveyor 20 then advances the carton S beyond the first folding station to where an article such as men's hose may be placed therein, during which another cycle of the carton delivery station A occurs.

Each of the pockets 17 may be in the form of a pair of longitudinally spaced angle plates j and k, one of which is secured to a longitudinally extending endless belt or sprocket chain 36 and the other of which is secured to a longitudianlly extending endless belt or sprocket chain 36' extending in spaced parallel relation to the sprocket chain 36 (Figures 3-A, 16 and 20), the sprocket chains being primary elements of the main conveyor 20. The pockets 17 may be of a type such as is disclosed in the copending application of Grover C. Currie et al., Serial No. 591,091, filed June 13 1956, and entitled Conveyor Mechanism, and therefore, a detailed description of the manner in which the pockets 17 are constructed is deemed unnecessary. It might be stated however, that the angle plates j and k are of built-up construction and one of the angle plates of each pair (j) is secured to one chain (36) and the other of the angle plates (k) is secured to the other chain (36') so the chains 36, 36' may be longitudinally adjusted relative to each other to vary the displacement between the angle plates comprising each pocket 17 to accommodate cartons of varying lengths.

The vertical portions or bars of the angle plates of each pocket 17 serve as carton end-wall supporting elements and are spaced from each other a distance substantially the same as or slightly greater than the length of the bottom 22 of the corresponding carton S. The horizontal portions of the angle plates of each pocket 17 serve as the bottom of the corresponding pocket for supporting the bottom 22 of each successive carton. The angle plates of the pockets 17 are adapted to move between carton side-wall guide plates 42, 42' (Figures 3-A, 8-A and 20) when forming the upper run of the conveyor 20. These carton side-wall guide plates or bars 42, 42' serve as a track or side walls of the pockets 17.

It will be observed in Figures 19 and 20 that one of the side walls of the tubular die 16 is provided with an inclined lower side wall portion 16a against which the side wall 23 and the relatively wide overflap 25 move as each successive blank S is forced into a corresponding pocket 17 on the main conveyor 20. At this time, the relatively narrow side flap 26 moves outwardly against a plate 16b connected to the outer surface of the side wall of the die 16 opposite from that side wall which has the inclined plate or portion 16a therebeneath.

It is apparent, by referring to Figures 19 and 20, that the inclined wall 16a and the wall 16b form shoulders at their junctures with the opposed side walls of the tubular die 16 which prevent the corresponding carton from being moved upwardly with the punch 35 in the course of its subsequent upward movement. Also, by referring to 20, it will be observed that the inclined wall 16a positions the wide side flap 25 of the carton S so its inner surface engages the outer surface of the ingress portion of the elongated horizontally disposed guide plate 42. Also, the plate 16b alines the narrow side flap 26 of the carton S with an inverted channel shaped or U-shaped narrow flap retaining portion 44 formed on the guide plate 42.

The lower edge of the inner portion of the channel 44 terminates above the level of the side wall 24 of the carton blank relative to the bottoms of the pockets 17 (Figure 20). The lower edge of the wide side flap guide 42 terminates above the level of bottoms of the pockets 17 so the carton bottom 22 and carton side wall 23 (Figure 10) may extend beneath the guide 42. A horizontally disposed wide flap-supporting plate 45 (Figures 3-A, 8-A and 18) is positioned along one side of the conveyor 20 on substantially the same level as the upper surfaces of the bottoms of the pockets 17 and a curved wide-flap distending plate or stationary cam 46 (Figure 20) is spaced forwardly from the die 16 and projects outwardly and downwardly from the upper portion of the wide-flap retaining guide 42 so as to be engaged by the leading edge of the wide flap 25 of the corresponding carton S and to swing the latter flap downwardly against the upper surface of the plate 45.

A wide-flap hold-down plate 47 is spaced slightly above plate 45 and forwardly of cam 46 and the wide flap 25 of the carton S passes beneath the plate 47 with further forward movement of the upper run of the conveyor 20. While the flaps 25, 26 of each successive carton S occupy the latter positions (see Figure 20), articles, such as pairs of hosiery and the like, may be manually positioned in the corresponding cartons as they continue forward movement with the conveyor 20.

Thereafter, the cartons S, in each instance, pass through a gluing or adhesive-applying station C which is best shown in Figures 12 and 13, and is also shown in Figures 1, 2, 3-A, 8-A, 11-A, 18, 25 and 29. The gluing station C comprises a substantially rectangular platen 50 having a substantially C-shaped projection on its lower surface which is shown in Figure 13 in the forms of a side bar $p$ and spaced end bars $q$ and $r$. The bars $p$, $q$ and $r$ may be termed as glue or adhesive applicator ribs or bars.

The platen 50 is normally disposed to one side of, and above the level of, the wide flap-supporting plate 45 (Figure 3-A) and moves inwardly in a substantially horizontal plane, during the course of which the lower surfaces of the applicator bars $p$, $q$ and $r$ ride against a glue or adhesive transferring roller 51. At precisely the moment that each successive carton S is alined with the platen 50, the platen 50 moves downwardly against a distended wide flap 25 by the applicator ribs $p$, $q$, and $r$, the platen 50 or adhesive to the flap 25 adjacent its outer edge and adjacent its end edges as at $p'$, $q'$ and $r'$ (Figure 10).

Immediately upon downward movement of the platen 50 and consequent engagement of the corresponding wide flap 25 by the applicator ribs $p$, $q$, and $r$, the platen 50 moves upwardly and then outwardly so the bars $p$, $q$ and $r$ are spaced above the glue transferring roller 51 whereupon the platen 50 returns to said normal position. Immediately after adhesive is applied to the wide flap of each successive carton S, the wide flap rides onto a wide flap projecting or lifting track or rod 54 whose rear or ingress end is spaced outwardly from the left-hand carton guide track 42 (Figure 3-A), and the rear end of the flap projecting track 54 is connected to the forward edge of the wide flap supporting plate 45. It will be observed in Figures 3-A and 8-A that the wide flap supporting plate 45 is cut away and terminates at the gluing station C.

The wide flap lifting track 54 curves upwardly and forwardly at an angle and also curves inwardly and its rear end terminates on substantially the same level as the upper edge of the left-hand carton guide track 42 (Figures 3 and 8), but rearwardly of the front end of the carton guide plate 42 and adjacent a second folding station broadly designated at D. The forward end of the wide flap lifting track 54 is attached to the out-turned rear portion of a wide flap stabilizing and overfolding plate 55 (Figures 3, 5, 6, 8, 11-B and 22) whose inner surface is disposed in substantially the horizontal plane as the inner surface of the side wall guide 42.

It will be noted in Figure 11-B that the right-hand side wall guide plate 42' also terminates in substantially lateral alinement with the front end of the left-hand side wall guide plate 42, adjacent the second folding station D. It is thus seen that, as each successive blank moves with the conveyor 20, after having passed the gluing station C, the wide flap 25 thereof, which occupied a horizontal position at the gluing station, is lifted to vertical position by the lifting track 54 so that it ultimately engages the inner surface of the wide flap stabilizing plate 55. At this point, each successive carton will have passed the second folding station D.

Generally, the folding station D comprises coaxial, diametrically opposed segmental overfolding cams 60, 61 which are spaced above, and constantly driven in accurately timed relation to, the intermittently driven conveyor 20. The folding cams 60 and 61 are of substantially the same radius and the first cam 60 extends through an arc of approximately sixty degrees and serves as a narrow side flap overfolding cam. The second cam 61 extends through an arc of approximately two hundred five degrees and may be termed as a trailing end flap overfolding cam.

It will be noted that the front end of the narrow flap retaining channel 44 terminates rearwardly of the overfolding cams 60, 61 and the right-hand side wall guide track 42' for the conveyor 20 has an inwardly extending projection 63 thereon (Figures 3 and 11-B) which engages the narrow side flap 26 of each successive carton as it moves out of the channel-shaped flap retaining member 44 of the side wall guide 42' and moves the side flap 26 inwardly to partially fold the same along the crease or score line $d$ (Figure 10). This alines the flap 26 of each successive carton S so as to be engaged by the first cam 60, which rotates at substantially the same surface speed as the rate of travel of the conveyor 20.

In so doing, the first overfolding cam 60 moves the narrow side flap 26 of the corresponding carton S downwardly to horizontal position overlying, but spaced above, the bottom 22 of the corresponding carton. While the end of the first overfolding cam 60 is in engagement with the narrow side flap 26 of the corresponding carton S, the leading end flap 32, which has assumed substantially vertical position up to this point, engages the rear upturned portion of, and passes beneath, a horizontally disposed package-forming or carton-forming plate 65 which, for purposes of distinction, may be termed as a sconcing plate. A right-hand side guide track extension 66 extends from the guide track 42' and terminates adjacent the front end of conveyor 20. Thus, the sconcing plate folds the leading flap 32 of each successive carton S along the crease or score line $g$ (Figure 10), in substantially horizontal position overlying the inwardly folded narrow side flap 26.

As the first overfolding cam 60 moves out of engagement with the narrow side flap 26 of the corresponding carton, which narrow side flap is then held in folded position by the sconcing plate 65, the leading edge of the second overfolding cam 61 (of which two are preferably used) moves downwardly and engages the then upstanding trailing end flap 33 of the corresponding carton S and moves the same downwardly to substantially horizontal position overlying the bottom 22 and the narrow side flap 26 of the corresponding carton. The cam or cams 61 are so positioned and operate in such timed relation to the forward movement of the conveyor 20 as to move the trailing end flap 33 of each successive carton so it will pass beneath the sconcing plate 65 so the package or carton is completely formed, with the exception that the wide side flap 25 still occupies substantially vertical position as the carton S moves into alinement with a compression unit broadly designated at E.

At precisely the time that each successive carton approaches the lateral plane of the compression unit E, an ejector mechanism functions to eject each successive carton off the conveyor 20 and out of the corresponding pocket 17. As best shown in Figures 3, 5 and 22, the ejector mechanism comprises an ejector plunger 67 which is shown in the form of a horizontally disposed plate normally positioned to one side of the conveyor 20 and whose inner end has an angle piece 70 (Figure 6) thereon for engaging and supporting one side of each successive carton. It will be noted that the lower forward portion of the right-hand side wall guide track extension 66 is cut away (Figures 6 and 11–B) to accommodate the ejector plate 67 and its angle piece 70.

As each successive carton moves into alinement with the ejector plunger 67, the ejector plunger is moved inwardly or from left to right in Figures 5 and 6 so the angle piece 70 thereon engages the side wall 24 and the bottom 22 of the corresponding carton and moves the same off the angle bars or angle plates of the corresponding pocket 17 and between upper and lower sets of spaced, parallel rollers 72 and 73 of the compression unit E. In so doing, the front of the wide side flap engages a wide side flap final folding member in the form of a raised edge 74 formed by recessing the lower central portion of the stabilizing plate 55 (Figures 6 and 11–B). It is apparent, by referring to Figure 6, that the raised edge 74 folds the wide side flap 25 of the corresponding carton against the end flaps 32, 33 and the narrow side flap 26 to close the corresponding carton.

As the carton moves from left to right in Figures 5 and 6, the vertical spacing of the rollers 72, 73 is such that they tightly close each successive carton S and also apply pressure thereto. The first few of the rollers 72, 73 are idler rollers so that, as each successive carton is ejected from a pocket 17 by the ejector plunger 67, it moves against and advances the immediately preceding carton so as to insure that opposite side walls 23, 24 (Figure 10) of each successive carton are perpendicular to the bottom and are also perpendicular to the end walls 30, 31. The perpendicular relationship of the side and end walls of each successive carton is further insured by providing a series of end wall compacting rollers 75, 75' which extend throughout the length of the compression unit on a level between the upper and lower pressure rollers 72, 73 (Figures 5, 6, 21 and 22).

The first few of the compression rollers 72, 73 in the left-hand portion of the compression unit in Figures 5 and 6 are idler rollers, as heretofore stated. However, upon two or more completed cartons being fed between the rollers 72, 73, the leading carton, in each instance, passes between others of the rollers 72, 73 some of which are driven. Thus, the cartons S are separated from each other and are ejected from the discharge end of the compression unit in spaced relationship, where they may fall into a suitable container, not shown.

It is thus seen that each successive carton, in blank form, is fed into the machine at the ingress end thereof, positioned upon the pre-forming die plate 15 and forced downwardly through the die 16 by the rectangular punch 35 and into a pocket in the conveyor, the conveyor being moved in timed relation with each upward stroke of the plunger 35. The side flaps 25, 26 of each successive carton S are then positioned in respective horizontal and vertical positions, adhesive is applied to the end edge portions and outer side edge portion of each successive wide side flap 25, and then the wide side flap 25 is lifted upwardly into vertical position. Thereupon the narrow side flap is overfolded, the leading and trailing end flaps are successively overfolded, and then the wide side flap 25 is folded over the end flaps and the other side flap 26 to close the container or carton S. Thereafter, each successive carton is ejected from the main conveyor 20 and passed through the compression unit E which applies pressure to the upper and lower surfaces of the carton as well as to opposite end walls thereof to insure that the glue or other adhesive on the wide side flap 25 tightly attaches the wide side flap to the end flaps 32, 33 and the narrow side flap 26 of each successive carton.

Having thus briefly described the invention, a more detailed description will now be given.

Blank delivery station A

The blank delivery station is shown in Figures 1, 2, 3–B, 4, 8–B, 11–B, 16 and 17. The blank delivery station A comprises left-hand and right-hand side frame members 80, 81 of a frame broadly designated at 82. The side frame members 80, 81 are fixed upon the rear portion of an elongated base 83 and are spanned by transverse frame members 84 through 87 suitably secured thereto. The frame member 84 supports a storage platform 90 (Figures 4 and 16) which is preferably provided with rollers 91 journaled therein for storing carton blanks S thereon. The carton blanks are removed from platform 90 by the operator and positioned upon rollers 92 of an elevator platform 93 carried by a vertically movable elevator bar 94. When carton blanks are to be transferred from the rollers 91 of the storage platform 90 onto the rollers 92 of the elevator platform 93, the elevator platform 93 is lowered to where the rollers 92 are disposed on approximately the same level as the rollers 91 and it is merely then necessary to push the blanks from the rollers 91 onto the rollers 92. The elevator bar 94 is mounted for vertical sliding movement on the frame member 85, the latter frame member being disposed forwardly of the frame member 84.

The elevator post 94 and elevator 93 may be raised and lowered by means substantially the same as that disclosed in said pending application Serial No. 499,652, however, a somewhat detailed description thereof will now be given. The elevator platform 93 is raised and lowered by means of a ratchet mechanism (Figure 23) where, at certain times when an uppermost of the carton blanks, in the stack positioned upon the rollers 92 of the elevator platform 93, is transferred therefrom by means which will be later described, a switch 98 is closed (Figure 17) to energize a solenoid 95 (Figures 16 and 23) which then moves a latch 96, pivotally mounted on the frame member 81, out of engagement with a dog 97 on the lower end of a lever 100. The latch 96 is normally biased upwardly by a spring 101 (Figures 16 and 23).

The lever 100 is oscillatably mounted on a shaft 102 suitably journaled in the frame members 80, 81 and has a ratchet pawl 103 thereon which normally engages a ratchet wheel 104 fixed on the shaft 102. Means is provided to impart reciprocatory motion to the lever 100, including a link 105 which is connected to a yoke 106 engaging a crank shaft or cam shaft 107 (Figures 9 and 23) on which a cam 108 is secured. The cam 108 engages a follower 111 fixed on the yoke 106 which is maintained in engagement with the cam 108 by means of a tension spring 112.

Now, referring to Figure 16, it will be observed that the shaft 102 has a pinion 113 fixed thereon which engages a rack 114 fixed to the bar 94 so that, with each active stroke of the pawl 103, an upward step is imparted to the elevator platform 93 and its rollers 92. Of course, each time a suction cup 135, to be later described, is lowered sufficiently due to the uppermost carton blank being below a given level, an abutment 99 (Figure 17) engages and closes switch 98. The solenoid 95 is then energized to move the biased latch 96 away from the dog 97 on the lever 100 to thereby permit further oscillation of the lever 100.

It will be observed in Figures 4 and 8–B that a handle 120 is fixed on a shaft 121 journaled in the frame members 80, 81 and which, in Figure 23, has a ratchet wheel restraining dog 122 fixed thereon. The restraining dog 122 normally engages the ratchet wheel 104 to prevent reverse movement thereof. However, when it is desired that the elevator 93 and its roller 92 be lowered to approximately the level of the rollers 91 on the storage platform 90, the handle 120 is rotated in the proper direction to move the dog 122 out of engagement with the teeth of the ratchet wheel 104, whereupon the elevator platform 93 and rollers 92 move downwardly to the limit to which they are permitted to move by engagement of the bar 94 with the upper surface of the main base 83.

It should be noted that stationary side walls 125, 126 (Figures 4 and 16) are suitably supported by the frame 82 and are disposed on opposed sides of the elevator platform 93 and the storage platform 90. In order to retain the carton blanks on the rollers 91 of the storage platform 90 and to also retain a stack of carton blanks on the rollers 92 of the elevator platform 93, a manually shiftable retaining bar 127 (Figures 4 and 16) is pivotally secured to the base 83, extends upwardly between the platforms 90, 93 and terminates adjacent the transverse frame member 87. The upper portion of the carton blank retaining bar 127 is normally positioned in a slotted block 130, fixed to frame member 87, and held therein by a hand screw 131. When the operator desires to transfer a stack of blanks from the rollers 91 onto the rollers 92, the rollers 92 are moved to lowered position, the hand screw 131 is loosened and the bar 127 is moved from right to left in Figure 4 or toward the observer in Figures 3–B and 16 and through a slot 132 provided therefor in the wall 125 adjacent the elevator platform 93, thus moving the bar 127 out of the horizontal planes of the platforms 90, 93 and the walls 125, 126.

The uppermost carton blank S in the stack positioned upon the rollers 92 of the elevator platform 93 is moved forward to the nip of the feed rolls 11, 12 by the suction feed mechanism 10, which comprises a vacuum-controlled blank grasping and transferring device 135 shown in the form of a resilient inverted suction cup in Figures 16 and 17. The suction cup 135 may be constructed, mounted and controlled in substantially the same manner as the suction cups associated with a similar feeding mechanism disclosed in said pending application, Serial No. 499,652.

In this instance, the suction cup 135 is suitably connected to a bracket 136 attached to a vertically reciprocal slide 137 carried by a longitudinally reciprocal bracket 140. The bracket 140 is reciprocally mounted on a stationary guide 141 fixed to the frame member 87 and extending forwardly therefrom (Figures 3–B, 8–B, 16 and 17). One side of the vertical slide 137 has a follower 142 thereon which rides against the upper surface of a guide arm 143 fixed on a rocker haft 144 journaled in the side frame members 80, 81. The horizontally reciprocal bracket 140 is connected, by a link 145, to one end of a crank 146 fixed on a rocker shaft 147 spaced above and forwardly of the rocker shaft 144 and journaled in the side members 80, 81 (Figures 1, 2, 3–B, 4, 8–B, 11, 16, 17 and 19).

The rocker shafts 144, 147 have respective cranks 150, 151 fixed thereon to which the upper ends of respective links 152, 153 are pivotally connected. It will be observed in Figures 4, 16, 17, 24 and 28 that the lower ends of the links 152, 153 are connected to one arm of a bell crank 154 and a crank 155, respectively. The bell crank 154 is oscillatably mounted on a rocker shaft 156 and the crank 155 is fixed on the rocker shaft 156. The shaft 156 is journaled in the side frame members 80, 81 as best shown in Figure 17.

A medial portion of shaft 156 has another crank 160 fixed thereon and the rear ends of links or thrust rods 161, 162 are connected to the bell crank 154 and the crank 160, respectively. The links 161, 162 extend forwardly and have respective yokes 163, 164 fixed thereon (Figures 9, 18, 24 and 28) provided with respective followers 165, 166 which are normally maintained in engagement with the peripheral surfaces of respective cam wheels 170, 171 fixed on the main cam shaft 107. As best shown in Figures 4 and 23, the follower 165 is maintained in engagement with cam 170 by a tension spring 173, one end being connected to the bell crank 154, its other end being connected to the base 83.

The follower 166 (Figures 9 and 28) is maintained in engagement with the cam 171 by means of a tension spring 174 (Figure 4) whose lower end is connected to the crank 155 and whose upper end is attached to frame member 84. It will also be observed in Figure 16 that the follower 142 is maintained in engagement with the upper surface of the guide arm 143 by a tension spring 175 whose upper end is connected to a plate 176 fixed to the upper end of the vertical slide 137 and whose lower end is connected to the horizontally reciprocal bracket 140.

Now, the suction cup 135 is connected to a suitable source of suction by means of conduit 177 in which a release cup member 180 (Figures 8–B and 17) is interposed and fixed to the side frame member 80. The open upper end of cup member 180 is adapted to be opened and closed by means of a valve 181 attached to the free end of a lever 182 pivotally mounted on the side frame member 80. The lever 182 is adapted to be engaged by a substantially L-shaped crank 184 fixed on the shaft 147 (Figures 3–B, 4, 8–B and 28). It is apparent that, when the lever 182 and its valve 181 are in lowered position, the cup-shaped member 180 is closed and thereby effects negative pressure in the blank-lifting suction cup 135 and, of course, the suction in the suction cup 135 is broken when the lever 182 and valve 181 are raised.

In operation, as the high point of cam 170 (Figure 24) engages follower 165, the guide arm 143 is elevated, and (assuming the suction cup 135 then occupies forward position substantially as shown in Figure 3–B) a low portion of cam 171 (Figure 28) then moves into engagement with the follower 166 to rock the shaft 147 in a counter-clockwise direction in Figures 8–B, 16 and 28. In so doing, crank arm 146 moves link 145 and the carriage or bracket 140 rearwardly to a position above the elevator platform 93 and, at the same time, the crank 184 is moved into engagement with and raises the lever 182 to open the valve 181.

Thus, the particular carton blank which may have been attached to the suction cup 135 at the time the suction cup occupied foremost position is released from the suction cup and there is no suction present in the suction cup as it moves rearwardly. It is apparent that, when the suction cup 135 occupies its foremost position as shown in Figure 3–B, and before it is elevated by the low point of cam 170 (Figure 24) engaging the follower 165 to impart upward movement to the lever or guide 143, the high point of cam 171 will have engaged the follower 166 so the valve 181 occupies raised position. Of course, as the high point of cam 171 moves out of engagement with the follower 166, the crank 184 is moved downwardly to permit the valve 181 to return to closed position so there is then suction present to the suction cup 135.

Thus, as the low surface of cam 171 is engaged by follower 166, the carriage or bracket 140 (Figures 16 and 17) is moved rearwardly to position the suction cup 135 above the elevator platform 93 and the stack of blanks S thereon. At this time, a low portion of cam 170 (Figure 24) moves into engagement with follower 165 to lower the guide arm 143 to where the suction cup 135 will engage the uppermost of the carton blanks in the stack positioned upon the rollers 92 of the elevator platform 93. In so doing, the abutment 99 on plate 176 on the upper end of the vertically reciprocal slide 137 engages and closes switch 98 to energize solenoid 95 (Figure 23) and thereby effect a step in upward movement of the elevator platform 93 (Figures 4 and 16) as a high portion of cam 170 (Figure 24) again engages follower 165 to raise the guide arm 143, and consequently raise the suction cup 135 with the corresponding carton blank attached thereto by the suction within the cup 135.

A high portion of cam 171 (Figure 28) then engages follower 166 to impart an active or forward stroke to the carriage 140 (Figures 16 and 17), during which the crank 184 commences upward movement and raises the valve 181 to open position (Figure 8–B) at precisely the time the suction cup 135 approaches foremost position to thereby release the corresponding blank as it contacts the nip of the feed rolls 11, 12 said feed rolls being driven constantly by means to be presently described.

During forward movement of the carriage 140, the guide arm 143 moves downwardly and is again moved upwardly as the suction is released from the cup in the manner heretofore described to complete a cycle of the carton blank grasping and feeding means.

*Blank feed rolls and transferring elements*

The upper feed rolls 11 are fixed on separate or individual shafts 190 whose proximal ends are spaced apart to accommodate the suction cup 135. The shafts 190 are journaled in the forward portions of respective pivoted brackets or arms 191 which extend rearwardly and whose medial portions are pivotally supported on respective brackets 192 which, as best shown in Figures 3–B, 4 and 8–B, extend rearwardly and are suitably secured to the lower surface of the transverse frame member 87. The outer ends of the shafts 190 each has a gear 193 fixed thereon each of which engages a gear 194. The gears 194 are fixed on a common transverse shaft 195 journaled in the side frame members 80, 81 and having a sprocket wheel 196 fixed on one end thereof (Figures 4, 8–B and 17).

The sprocket wheel 196 is engaged by a sprocket chain 197 which extends downwardly and engages a sprocket wheel 200 fixed on a transverse shaft 201 journaled in the side frame members 80, 81. The shaft 201 also has a sprocket wheel 203 fixed thereon which is engaged by a sprocket chain 204 which extends forwardly in Figures 8–B, 8–A and 9 and is also mounted on a sprocket wheel 205 fixed on drive shaft 206 journaled in an intermediate side frame member 207, fixed on the base 83.

A similar side frame member 208 is disposed at the opposite side of the machine. The shaft 206 is also journaled in a bracket or standard 211 carried by the base 83. It will be observed in Figures 8–A and 9 that the shaft 206 has a pulley 212 fixed thereon which is connected, by means of an endless belt 213, to a pulley 214. The pulley 214 is driven by an electric motor 215 or other prime mover and is preferably of the variable pitch or variable speed type. Accordingly, the motor 214 is preferably attached to the base 83 through the medium of a motor adjusting carriage generally designated at 216, which carriage may be of conventional or other construction and may also be of the type disclosed in said pending application, Serial No. 499,652. Therefore, a further detailed description of the carriage 216 is deemed unnecessary.

As heretofore stated, the feed rolls 11, 12 feed each successive carton blank onto the plate 13. This plate 13 may be suitably supported on the frame. To this end, the rear ends of upper and lower horizontal side frame bars 221, 222 and 223, 224 (Figures 8–B, 11 and 17) are connected to the inner surfaces of the rear portions of the respective side frame members 80, 81. The front ends of the side frame bars 221, 223 are attached to the upper ends of respective posts 225, 226 (Figures 8–B, 11 and 18). The lower ends of the posts 225, 226 are attached to medial portions of the respective side frame bars 222, 224 and a transverse frame member 227 (Figures 3–A, 8–A and 11–A) is also attached to the frame members 222, 224 adjacent the posts 225, 226. The front ends of the lower side frame bars 222, 224 are attached to a transverse frame member 230 (Figure 3–A) extending between the upper rear portions of the intermediate side frame members 207, 208.

The blank supporting plate 13 is suitably secured to the upper surfaces of the upper side frame bars 221, 223 and, in turn supports the die platform 15. The die platform 15 is preferably formed from a plurality of plates adjustably secured to the blank supporting platform 13 in order to be either replaced by other similar plates or relatively adjusted to accommodate carton blanks of varying sizes.

In order to properly guide each successive blank as it is fed through the feed rolls 11, 12, a pair of spaced parallel blank guide members 231 is suitably secured to the upper surfaces of the support plate 13 and the die platform 15. Each of the guides 231 is provided with an inwardly projecting rib 232 (Figures 3–B, 16 and 17) which is spaced slightly above the plate 13 and serves to hold the outer edge portions of each successive blank against plate 13 as the blanks S are advanced by lugs 14a on the blank transferring chains 14. A medial portion of each successive blank S is also maintained in engagement with the plate 13 by means of a hold-down bar or blade 233 which overlies the rear portion of plate 13 and is fixed to the stationary guide bar 141 on which carriage 140 is mounted (Figure 16).

As heretofore stated, the blank supporting platform 13 is provided with suitable slots 234 (Figure 17) to accommodate the upper runs of the blank transferring chains 14. The upper runs of the chains 14 are each mounted on a pair of sprocket wheels 235, 236 (Figures 16 and 17). Each of the chains 14 is also mounted on a relatively large sprocket wheel 237 spaced below the blank supporting plate 13. The sprocket wheels 235 are fixed on the shaft 195, and the sprocket wheels 236 are fixed on a shaft 240 spaced forwardly from shaft 195 and journaled in the upper side frame bars 221, 223. The sprocket wheels 237 are each loosely mounted or journaled on a rear transverse main conveyor shaft 241 (Figure 17) journaled in bearings carried by the lower longitudinal side frame bars 222, 224.

Since the shaft 195, on which the bottom feed rolls 12 are mounted, is constantly driven by the electric motor 214 in the manner heretofore described, it is apparent that the carton blank feed chains 14 are also constantly driven thereby. As heretofore stated, as each successive blanks S is delivered onto the blank supporting plate 13, lugs 14a (Figure 16) on the transferring chains 14 engage the trailing edge of each successive carton blank and move the same forwardly to accurately position the same upon the die platform 15. An abutment 243 is provided on the platform 15 (Figures 8–B and 18) against which the leading edge of the leading end flap 32 (Figures 3–B and 10) of each successive carton is positioned by the lugs 14a on the blank feed chains 14.

*First folding station B*

As heretofore stated, the first folding station or preforming station comprises the die platform 15, its die 16 and the vertically reciprocal punch or block 35. It is apparent from the foregoing description that the side walls of the die 16 are attached to the die plate or platform 15 and that the top, bottom and front and rear ends of the die 16 are open; that is, the lower edge of the front wall of the die 16 terminates on a level spaced sufficiently above the main conveyor 20 so the end flaps 32, 33 of each successive carton S may remain in upright position as each successive carton is advanced by the conveyor 20. It will be observed in Figures 16 and 19 that the various walls of the die 16 are in the form of angle plates which may be suitably supported on the frame 82 so the horizontal portions thereof form the die platform 15. The platform 15 should be flush with the platform 13.

The punch 35 is fixed on the lower end of column or plunger 250 whose upper end is fixed to a medial portion of a cross arm or cross head 251 (Figures 3–B, 4, 8–B and 18) whose opposite ends are mounted for vertical sliding movement on a pair of guide posts 252, 253. The lower ends of the guide posts 252, 253 are fixed to the upper longitudinal side frame bars 221, 223 (Figure 18) and their upper ends are fixed to opposite ends of a reenforcing bar 255. Opposite ends of the cross head 251 have the upper ends of links 256, 257 pivotally connected thereto whose lower ends are pivotally connected to respective crank arms 260, 261.

The crank arms 260, 261 extend forwardly in Figures 8, 8–A and 11, 11–A respectively, and are fixed on a rocker shaft 262 journaled in intermediate side frame members 207, 208. It will be observed in Figures 18 and 27 that a medial portion of the shaft 262 has a bifurcated crank 263 fixed thereon which extends downwardly and is pivotally connected, as at 264 (Figures 9 and 27), to a yoke 265 having a cam follower 266 thereon which is urged into engagement with a cam wheel 267 (fixed on the main cam shaft 107) by the weight of the cross head 251 and the parts carried thereby.

The cam 267 is so shaped as to impart a downward stroke to the punch 35 as each successive pocket 17 on the main conveyor 20 approaches the pre-forming die 16 and to be accurately alined with the open lower end of the pre-forming die 16 when the punch 35 reaches the end of each downward stroke. Of course, the cam 267 (Figures 18, 27 and 29) also causes the punch 35 to dart upwardly immediately upon having reached the end of each downward stroke.

Now, in order to insure that the wide flap 25 of each successive carton S is moved outwardly against the plate 16a in the lower portion of the die 16 (Figures 19 and 20) as each successive blank is pre-formed through the pre-forming die 16 by the punch 35, the column 250, to whose lower end the punch 35 is attached, has a wide flap push-out mechanism, broadly designated at 270, mounted thereon (Figures 3–B, 8–B, 11, 16 and 18). The push-out mechanism 270 comprises a bracket 271 fixed to one side of the column 250 and to a lower inner portion of which a bar 272 is hingedly connected. The bar 272 has a plurality of bearing brackets 273 fixed thereto and depending therefrom, each of which has a roller or bearing 274 journaled thereon (Figures 16 and 18). The hinged bar 272 is normally urged outwardly by a tension spring 276, one end of which is connected to the column 250 and the other end of which is connected to an arm 277 which extends downwardly and then outwardly (in substantially L-shaped form) and is attached to the bar 272.

Thus, the spring 276 normally urges the bar 272 against the bracket 270 and, accordingly, the bracket 270 limits outward movement of the bar 272 and the corresponding rollers 274. As the punch 35 and column 250 move downwardly, the rollers 274 engage and are biased inwardly by the corresponding side wall of the die 16 and by the wide flap 25 of the corresponding carton blank S which wide flap is then positioned against the inner surface of said corresponding wall. As the punch 35 reaches its lowermost position in the course of each downward stroke, the rollers 274 move outwardly as they move below the level of the upper edge of the inclined side wall portion 16a (Figure 19) of die 16 to deflect the corresponding wide flap 25 outwardly against the wall 16a. This insures that the wide flap 25 of each successive carton S is alined so as to engage the outer surface of the longitudinally extending carton guide bar 42 adjacent the conveyor 20, as heretofore described.

*Main conveyor and drive means*

It has already been described how the main conveyor comprises the two endless sprocket chains 36 having the pockets 17 mounted thereon into which successive cartons are positioned by the carton pre-forming mechanism including the punch 35 and the die 16. As best shown in Figures 16 and 17, the rear portions of the chains 36, 36' of the main conveyor 20 are mounted on respective sprocket wheels 280, 280'. Sprocket wheel 280 is journaled on the shaft 241 and the sprocket wheel 280' is fixed on the shaft 241. The forward portions of the conveyor chains 36, 36' are mounted on respective sprocket wheels 281, 281'.

The sprocket wheel 280 is journaled on the shaft 241 to facilitate longitudinal adjustment of the sprocket chain 36 and its angle plates or flight bars j, forming corresponding ends of the pockets 17, relative to the angle plates or flight bars k of the pockets 17 carried by the other chain 36' to thereby vary the longitudinal dimension of the pockets 17. The means for adjusting the sprocket chain 36 relative to the sprocket chain 36' is substantially as disclosed in said co-pending application, Serial No. 591,091, and is best illustrated herein in Figures 3, 5 and 7.

It will be observed in Figure 7 that the sprocket wheel 281 is journaled on a shaft 285, and the sprocket wheel 281' is fixed on the shaft 285. The shaft 285 is journaled in a pair of spaced bearing blocks 286, 287, fixed to and projecting rearwardly from a transverse upright rear end frame member or egress end frame member 290, forwardly from which a corresponding transverse upright frame member 291 is positioned. The frame members 290, 291 are fixed upon the main base 83.

The adjustable sprocket wheel 281 has a worm gear 292 fixed on the hub thereof which is engaged by a manually adjustable worm 293 journaled in a housing 294 fixed on the shaft 285. It is apparent that manual rotation of the worm 293 will adjust the sprocket wheel 281 about the shaft 285, and relative to the sprocket wheel 281', to thereby effect relative adjustment between the sprocket chains 36, 36'. The shaft 285 is driven intermittently and, in order to prevent movement of the shaft 285 in the interim between successive steps in rotation thereof, a suitable manually adjustable brake mechanism, broadly designated at 295, is provided on the shaft 285 as best shown in Figure 7. The brake mechanism 295 does not necessarily constitute an element of the present invention and a detailed description thereof is deemed unnecessary, since there are many different types of brake mechanisms which may be utilized for this purpose.

The means for imparting step-by-step rotation to the shaft 285 comprises a pinion 300 fixed on the shaft 285, which pinion is engaged by a rack 301 guided for longitudinal movement in the bearing bracket 287. The lower end of the rack 301 is pivotally connected to the upper end of a link 302 (Figure 8) whose lower end is connected to crank 303 fixed on a transverse shaft 304. The shaft 304 is journaled in a pair of laterally spaced frame members 305, 306 (Figures 8 and 11–B) suitably secured to and extending between the upright frame members 290 and 291. The shaft 304 is constantly driven by means of a sprocket wheel 310 (Figure 8) on which an endless sprocket chain 311 is mounted. The sprocket chain extends rearwardly in Figures 8 and 8–A and is mounted on a sprocket wheel 312 fixed on the main cam shaft 107 (Figure 9). The manner in which the shaft 107 is driven will be presently described.

To further insure that the conveyor 20 comes to rest at the proper position at the end of each step thereof, a plate or disk 315 fixed to the outer surface of the sprocket wheel 281' (Figures 3, 7 and 11–B) is provided with a pair of diametrically opposed notched members 316 thereon whose notches are adapted to be alternately engaged by a latch 317. The latch 317 is carried by a lever 320 (Figure 11–B) oscillatably mounted, as at 321, on the rear end frame member 290. The forward end of lever 320 has the upper end of a follower arm 322 pivotally connected thereto whose lower portion has a follower 323 thereon which bears against the periphery of a cam 324 fixed on the shaft 304. The cam 324 is so shaped as to cause the latch 317 to move into engagement with one of the notched members 316 at the end of each downward stroke of rack 301.

The shaft 107 (Figures 8–A and 9) may be driven in substantially the manner described in said copending application, Serial No. 499,652 and only so much of the driving means will be described as is deemed necessary to a clear understanding of the present invention. A gear 327 fixed on shaft 107 meshes with a pinion 328 fixed on a shaft 329. Shaft 329 is journaled in the intermediate side frame member 207 and in the frame member 211. The shaft 329 has a suitable brake mechanism or friction mechanism 330 thereon for effecting immediate stoppage of the shaft 329 upon de-energization of the motor 214 (Figure 8–B). The shaft 329 is driven by means of a gear 331 fixed on the shaft 206 (Figure 9). The gear 331 meshes with a larger gear 332 fixed on the shaft 329. Shaft 107 is journaled in frame members 207, 208.

It is thus seen that the shaft 107 may be continually driven when motor 214 is energized. A suitable clutch mechanism 334 may be mounted on the shaft 107 between the gears 327 and the sprocket wheel 312, if desired, to enable stopping the main cam shaft 107 while the motor 214 remains in operation and while the carton blank transferring rolls 11, 12 continue to rotate. Such a clutch mechanism is fully disclosed in United States Patent No. 2,732,984, dated January 31, 1956, issued to Bernard D. Dans, and is also disclosed in said co-pending application, Serial No. 499,652. Accordingly, a further description of clutch mechanism 334 is deemed unnecessary. It might be stated, however, that the clutch mechanism 324 is controlled by a lever 335 (Figures 8–A and 9) to one end of which a solenoid plunger 336 is connected. The solenoid plunger 336 is surrounded by a coil 337 carried by a standard 340 fixed upon the main base 83. Energization of coil 337 engages or activates clutch 334.

*Gluing station C*

As heretofore stated, after each successive carton blank is forced through the die 16 and into a pocket 17 of the conveyor 20, the carton S is advanced, during which the wide flap 25 thereof is distended by the stationary cam 46 (Figure 8–A) and passes between the plate 45 and hold-down plate 47. At this time, an article or articles are manually placed in the corresponding open carton S.

As the wide flap 25 of each successive carton S passes between the plates 45, 47, it engages and momentarily closes a switch 345 (Figure 3–A) interposed in an electrical circuit to a solenoid 346 (Figure 8–A) suitably secured to and depending from the upper horizontal portion of an angle plate 347 (Figures 8–A and 18). Angle plate 347 is fixed to the outer end of a bar 315 whose inner end is suitably secured to an upright 351 which is, in turn, suitably secured to a transverse frame member 352 suitably secured, at opposite ends thereof, to the upright frame members 207, 208 of main frame 82. Energization of the solenoid 346 affects a cycle in operation of the gluing station C.

The gluing station constitutes one of the most important advancements of the present invention and, as heretofore stated, it comprises the platen 50 provided with the applicator pattern bars or *p, q, r* which receive glue or liquid adhesive from a transferring roller 51 (Figures 12 and 13) and then drop upon the distended wide flap 25 of each successive carton with each actuation of the gluing station C to leave a predeterminedly configured pattern or film of adhesive on the flap 25 of the carton S.

Now, the adhesive transferring roll 51, which is preferably covered with a flexible material or gelatin, receives a film of liquid adhesive from an adhesive pick-up roll 355 (Figures 3–A, 12 and 29). The pick-up roll 355 is partially immersed in or touches liquid adhesive carried by a vertically adjustable container or reservoir 356 (Figure 29) provided with a downwardly extending post 357 thereon on which a follower 360 is mounted. Follower 360 rests upon a cam 361 fixed on a shaft 358 journaled in a guide block 362 depending from frame member 364, and in which the lower portion of the post 357 is mounted for vertical movement. Shaft 358 is also journaled on frame member 207 and has a hand-wheel 359 thereon (Figure 8–A). Thus, the cam 361 may be manually rotated for varying the displacement between the pick-up roll 355 and the adhesive in the reservoir 356.

Reduced opposite ends of the pick-up roll 355 are journaled in a pair of brackets 363 which extend outwardly and are fixed to a longitudinally extending frame member 364 suitably secured to and extending between the transverse frame members 230 and 352. Reduced opposite ends of the adhesive transferring roll 51 are journaled in spaced brackets or levers 366 oscillatably mounted intermediate their ends, as at 367, on the respective brackets 363, and whose outer ends are each penetrated by a screw 370 which bears against the outer portion of the corresponding bracket 363. Thus, the displacement between the transferring roll 51 and the pick-up roll 355 may be varied as desired.

The rolls 51, 355 are driven to rotate at substantially the same surface speed by a pair of intermeshing gears 371, 372 (Figures 3–A and 18) which gears are mounted on the reduced rear ends of the respective rolls 355, 51. The reduced rear end of the transferring roll 51 also has a sprocket wheel 374 fixed thereon which is engaged by a sprocket chain 375. Sprocket chain 375 extends outwardly and also engages a sprocket wheel 376 which is fixed on a longitudinally extending shaft 377. The shaft 377 (Figures 3–A, 8–A and 29) is journaled in the upright frame member 351 and a corresponding upright frame member 380. Frame member 380 is suitably secured to a medial portion of the longitudinally extending frame member 364 heretofore described.

The front end of shaft 377 has a bevel gear 381 fixed thereon which meshes with a bevel gear 382 fixed on a stub shaft 383 journaled on the intermediate side frame member 207 (Figure 3–A). The stub shaft 383 has a sprocket wheel 384 fixed thereon which is engaged by an endless sprocket chain 385 which also engages sprocket wheels 386, 387. The sprocket wheel 386 is an idler suitably journaled on the side frame member 207 and the sprocket wheel 387 is fixed on the constantly driven jack shaft 329 heretofore described. It is thus seen that rotation is continuously imparted to the adhesive transferring roll 51 and the pick-up roll 355 during operation of machine.

The upright frame members 351, 380 have corresponding ends of longitudinally extending rocker shafts 390, 391 journaled therein. The rocker shaft 390 is instrumental in raising and lowering the platen 50 and the rocker shaft 391 is instrumental in shifting the platen 50 inwardly and outwardly. It should be noted that the means for shifting the platen 50 inwardly and outwardly operates continuously in timed relation to the conveyor 20 while, on the other hand, the means for raising and lowering the platen 50 is effective only following energization of the solenoid 346 (Figure 8–A) by a flap 25 closing the switch 345, as heretofore stated. Thus, although the platen 50 reciprocates continuously, it is maintained inoperative unless actuation thereof is effected by a flap 25, or other means, closing the switch 345.

The means for shifting the platen 50 inwardly and outwardly will now be described. As best shown in Figures 3–A, 8–A and 12, the platen 50 is fixed to the lower end of a vertically movable guide bar 392 guided for vertical movement in a carriage 393. Carriage 393 (Figure 29) is guided for horizontal movement (inwardly and outwardly relative to the conveyor 20) on a substantially horizontally disposed dove-tailed guide bar 394.

The guide bar 394 is suitably secured to the inner surface of the upright frame member 380. The outer end of the carriage 393 has one end of a connecting rod or link 395 pivotally connected thereto, whose outer end is pivotally connected to a crank 396 which extends downwardly and is fixed on the shaft 391. The shaft 391 also has a crank 397 fixed thereon (Figure 3-A) to which the upper end of a follower arm 400 is pivotally connected as best shown in Figures 18 and 26.

The arm 400 has a follower 401 thereon which is urged, by a spring 403, into engagement with the periphery of a cam wheel 402. The upper end of tension spring 403 is connected to the arm 400 and the lower end thereof is connnected to the base 83. It will be observed in Figure 9 that cam wheel 402 is located inwardly of a cam wheel 405, adjacent the outer end of which the lower portion of a follower arm 407 is positioned (Figures 8-A and 25). The lower end of the follower arm 407 has a follower 408 thereon which rides against the lower surface of the cam wheel 405 and is normally urged thereagainst by means of a tension spring 410. The lower end of tension spring 410 is connected to a medial portion of the arm 407 and the upper end thereof is connnected to the angle plate 347 from whose upper portion the solenoid 346 depends. The upper end of the follower arm 407 is pivotally connected to the free end of a crank 412 fixed on the shaft 390, and the shaft 390 also has the outer end of a vertically movable platen-guiding track 413 fixed thereon. The movable track 413 is shown in partially lowered position in Figure 29.

As best shown in Figure 12, the track 413 overlies the platen 50 and its upper surface is engaged by a roller or follower 415 projecting rearwardly from the vertically movable guide bar 392 having the platen 50 on the lower end thereof. It will be noted that the vertically movable guide bar 392 also has a follower 416 projecting forwardly therefrom, the carriage 393 being suitably apertured to accommodate the follower 416. The follower 416 normally rests upon a stationary platen guide track 417 fixed to the upper surface of a block 418 (Figures 12 and 29) carried by the horizontal guide bar 394 fixed to frame member 380.

As shown somewhat schematically in Figure 25, the coil of solenoid 346 has conductors 420, 421, leading from opposite ends thereof, the conductor 420 being connected to one side of a source of current and the conductor 421 being connected to one side of the switch 345. A conductor 422 leads from the other side of the switch 345 to the other side of the source of current. The lower end of the plunger of solenoid 346 is pivotally connected to an L-shaped latch 423 oscillatably mounted, at the juncture of its arms, on the vertical portion of the angle plate 347, as at 424 (Figure 8-A). The lower end of the vertical arm of the latch 423 is normally positioned in the plane of, and engages with, a projection 425 on the follower arm 407.

Thus, when the switch 345 is open, although the low surface of cam 405 (Figure 25) moves into the vertical plane of the follower 408, the follower arm 407 is restricted from moving upwardly and, therefore, the vertically movable track 413 remains in raised position. On the other hand, when the switch 345 is closed, the latch 423 is moved out of engagement with the projection 425 so the spring 410 may lift the follower arm 407 as a low surface on the cam 405 moves into the vertical plane thereof. It is apparent that this will cause the vertically movable platen track 413 to move downwardly at its free inner end.

Of course, downward movement of the track 413 is effected in timed relation to movement of the carriage 393. Since the front follower 416 on the vertically movable guide bar 392 rests or rides upon the stationary track 417 as the vertically movable track 413 moves downwardly, the track 413 then moves away from the rear follower 415. The inner free end of the stationary platen track 417 is accurately positioned relative to the conveyor 20 and its pockets 17 so that, when the movable track 413 is in lowered position, the front follower 416 falls off the free front end of the stationary track 417 and causes the ribs $p$, $q$, $r$ (Figure 13) to engage the distended wide flap 25 of the carton S at precisely the desired area to form the adhesive areas $p'$, $q'$, $r'$ (Figure 10) on the wide flap 25.

A high surface on the cam 405 (Figure 25) then moves into engagement with the follower 408 to raise the vertically movable platen track 413 which, in turn, engages the rear follower 415 on the vertically movable guide bar 392 to raise the platen 50 to where the follower 416 is then disposed on substantially the same level as, or above the level of, the track 417. An outward stroke is then imparted to carriage 393 by movement of a low surface on the cam wheel 402 (Figure 26) into engagement with the follower 401. It should be noted that the stationary platen track 417 is so positioned relative to the adhesive transferring roll 51 that the lower surfaces of the ribs $p$, $q$ and $r$ on the platen 50 engage or rub against the adhesive transferring roller 51 so as to pick up a film of adhesive thereon for subsequent application to the wide flap 25 of the corresponding carton. Also, as the vertically movable track 413 moves upwardly, it is preferably moved to such extent that the ribs $p$, $q$, $r$, will pass above and in spaced relation to the adhesive transferring roll 51 in the course of each inactive or outward stroke thereof.

This completes a cycle in the operation of the adhesive applying or gluing station C.

Second folding station D

The manner in which the second folding station D is generally constructed and the manner in which it operates have been described and, therefore, only the details of the manner in which folding cams thereof are constructed and driven will now be described.

The first and second overfolding cams 60, 61 are fixed on a transverse shaft 450 spaced a predetermined distance above the path of travel of the cartons S in the pockets 17 of the conveyor 20 (Figures 1, 2, 3, 5, 6, 8 and 11-B). One end of shaft 450 is journaled in a vertically adjustable bearing block or housing 451. The housing 451 is fixed to the upper end of a guide post 452 whose lower portion is guided for vertical sliding movement in a guide block 453 suitably secured to a longitudinally extending side frame member or bar 454. A similar bar 455 is provided at the other side of the machine and these bars 454, 455 extend between, and are suitably connected to, the transverse frame member 352 (Figure 18) carried by the intermediate side frame members 207, 208, and the transverse upright frame member 291 (Figure 3).

Referring to Figure 11-B, the housing or bearing block 451 is suitably restrained from vertical movement relative to a shaft or screw 460 by a collar 459 fixed on shaft 460. Shaft 460 has a hand-wheel 461 on its upper end and its lower portion is threaded through the built-up guide block 453. It is, therefore, apparent that rotation of hand-wheel 461 and shaft 460 will effect vertical adjustment to the bearing block 451 and the shaft 450 on which the cams 60, 61 are mounted.

The shaft 450 has a pinion or gear 463 fixed thereon which meshes with a similar gear or pinion 464 journaled on a stub shaft 465 projecting outwardly from bearing block 451 and which stub shaft also has a sprocket wheel 466 fixed thereon. The sprocket wheel 466 is engaged by an endless sprocket chain 467 which also engages a pair of idler sprocket wheels 470, 471 and a driven sprocket wheel 472 (Figure 11-B). The idler sprocket wheel 470 is suitably journaled on the longitudinally extending side frame member 454. The idler sprocket wheel 471 is mounted on a stub shaft 474 whose opposite ends are guided for vertical movement in vertically slotted plates 475 fixed on the base 83. The upper ends of a pair of links 476 straddle sprocket wheel 471 and are mounted on the shaft 474. The lower ends of the links 476 are pivotally mounted on a shaft 477, guided for vertical movement in the slotted plates 475, and on which a weight 480 is suitably supported. It is apparent that the weight 480 maintains tension in the endless sprocket chain 467 while permitting vertical adjustment of the housing 451.

The sprocket wheel 472 is fixed on a transverse shaft 481 journaled in bearings 482 depending from the longitudinally extending side frame members 454, 455. It will be observed in Figures 6, 8 and 11–B that shaft 481 is driven by means of a pair of sprocket wheels 486, 487 over which an endless sprocket chain 490 is entrained. The sprocket wheel 486 is fixed on shaft 481 and the sprocket wheel 487 is fixed on shaft 304.

Ejector mechanism

It has already been described that the ejector plunger or plate 67 and its angle piece 70 move across and above the conveyor 20 to eject each successive carton from a corresponding pocket 17. The means for operating the ejector plunger 67 is best shown in Figures 3, 5, 6 and 11–B, wherein it will be observed that the ejector plunger 67 is fixed, at its outer end, to a laterally movable guide block 500 guided for such lateral movement on a stationary guide bar 501. The guide bar 501 is fixed to a frame member 502 which extends transversely of the frame members 290, 291, but longitudinally of the machine proper, and is fixed to said frame members 290, 291.

The laterally movable guide block 500 is connected by a link 504, to one arm of a bell crank 505 (Figures 5 and 6). The bell crank 505 is fixed on a shaft 506 journaled in bearings 507 which extend inwardly and are suitably secured to the respective transverse upright frame members 290, 291. The other arm of bell crank 505 has the upper end of a connecting rod or follower arm 510 pivotally connected thereto which extends downwardly in Figures 5, 6 and 11–B and has a follower 511 on its lower portion maintained in engagement with the lower surface of a cam wheel 512 by means of a tension spring 513. The outer end of tension spring 513 is connected to the upper arm of bell crank 505, and the inner end of tension spring 513 is connected to a block 514 (Figure 6) projecting forwardly from the rear end frame member 290. It is apparent that the cam 512 is so shaped as to impart an active and then an inactive stroke to the ejector plunger 67 in the interim between successive steps by the main conveyor 20.

Carton compression unit E

The compression unit E is best shown in Figures 3, 4, 5, 6, 8, 21 and 22. As heretofore stated, the compression unit comprises upper and lower series of rollers 72, 73 and side series of rollers 75, 75'. All of the side compacting rollers are idler rollers; that is, they are driven solely by contact with opposite ends of cartons S passing therebetween, as best shown in Figure 22. The side compacting rollers 75, 75' are journaled on the upper ends of respective stub shafts 520, 520' (Figure 22) which shafts are fixed in respective longitudinally extending frame members 521, 521'; that is, the frame members 521, 521' extend longitudinally of the compression unit E, but extend transversely of the machine proper. The frame members 521, 521' are fixed to the upper ends of respective pairs of inner and outer angle blocks 522, 523 and 522', 523' (Figures 6, 8 and 22).

The inner blocks 522, 522' fit in a groove 524 formed in a horizontal frame member 525, and the outer blocks 523, 523' fit in a groove 526 (Figure 6) formed in an outer cross frame member 527. As best shown in Figure 22, each of the blocks 522, 523, 522' and 523' is secured in the groove in the corresponding cross bar by a bolt 530 which loosely extends through an adjustment slot 531 formed in the bottom of the corresponding cross bar. Two of the slots 531 are provided in the inner cross bar 525 and two similar slots are provided in the cross bar 527. Internally threaded blocks 532, 532' depend from the respective longitudinally extending frame members 521, 521', there being three sets of such blocks shown in Figures 5 and 6. A shaft 534, having oppositely threaded opposite end portions thereon, penetrates each set of threaded blocks 532, 532' (Figure 22), and has a suitable handle or hand-wheel 535 on one end thereof.

Thus, the displacement between the rollers 75 and the rollers 75' may be accurately determined by loosening the nuts on the lower ends of the bolts 530 and then turning the shafts 534. Since the shafts 534 are threaded through the blocks 532, 532' and left-hand and right-hand threads are provided on the respective opposite end portions of the shafts 534, it is apparent that rotation of shafts 534 will cause the bars 521, 521' and the respective rollers 75, 75' to move toward and away from each other, depending upon the direction in which the shafts 534 are rotated. The nuts may then be secured on the bolts 530 to hold the rails or frame members 521, 521' in the desired adjusted position.

Each of the rolls in the bottom series 73 is in the form of an elongated roller or cylindrical member 540 fixed on a shaft 541 which is journaled at opposite ends thereof in the rails 521, 521' (Figure 22). On the other hand, the upper roll series 72 includes elongated cylindrical rollers 541 which are of substantially the same length as the elongated bottom rollers 543 and which are also fixed on respective shafts 544. However, it will be observed in Figures 3 and 21 that the upper roll series 72 also includes rollers each comprising a plurality of axially spaced discs 546 or ball bearings mounted on a corresponding shaft 547.

The ingress end (zone X) of the compression unit E is provided with several of the rolls comprising the discs 546 mounted on corresponding shafts 547, wherein the discs of adjacent rollers are staggered relative to each other, to thereby provide relatively narrow pressure surfaces against the cartons S as they are ejected from the conveyor 20 into the compression unit E. This insures that the wide flap 25 of each successive carton S is tightly sealed in engagement with the narrow side flap and end flaps 26, 32 and 33 of each successive carton S.

As heretofore stated, the first few rollers in each series (zone X) are idler rollers for sufficient distance lengthwise of the compression unit E in order to accommodate at least two of the cartons S so that each successive carton is initially forced against the preceding carton to insure that opposite side walls 23, 24 (Figure 10) of each successive carton are perpendicular to the bottom 22 and the end walls 30, 31 of the corresponding cartons S. It is also apparent that the vertical rollers 75, 75' snugly engage opposite end walls 30, 31 of each successive carton to further insure that they extend perpendicular to the bottom 22 of the carton S.

At the end of certain active strokes of the ejector plunger 67, which may be every second or third stroke thereof, the leading carton is then projected between rollers in the series 72, 73 embracing a driven zone Y (Figures 3 and 5) wherein some of said rollers are driven so as to advance corresponding cartons away from the next succeeding cartons. Also, it will be noted that, in the zone Y in which the rollers are driven, some of the rollers 543 are provided which are spaced from each other, with interventing rollers, comprising the discs 546 and shaft 547, being disposed between adjacent rollers 543, there being two sets of the rollers or discs 546 between adjacent rollers 543.

Referring to Figures 3, 21 and 22, it will be observed that opposite end portions of all the shafts 544 and 547 are journaled in upper rails or frame members 550, 550' spaced above the respective side compacting rollers 75, 57'. Each of the upper rails 550, 550' has a plurality of outwardly projecting blocks thereon, the blocks on bar 550 being indicated at 551 and the blocks on rail 550' being indicated at 551'. The blocks 551, 551' have respective adjustment screws or threaded shafts 552, 552' threaded therethrough, whose upper ends have respective hand-wheels 553, 553' fixed thereon, and whose reduced lower ends are journaled in respective blocks 554 (Figure 5) and 554' (Figure 4). It is apparent that the displacement between the rolls in the upper series 72 and the rolls in the lower series 73 may be varied, as desired, by manipulation of the adjustment screws 552, 552'. Certain spaced rolls in zone Y of the lower series 73 are driven.

To this end, it will be observed in Figures 3, 5, 21 and 22 that corresponding ends of certain of the shafts 541 on which lower rollers 540 of series 73 are mounted, each has a sprocket wheel 557 fixed thereon. All of the sprocket wheels 557 are engaged by a common endless sprocket chain 558. On the other hand, each of the shafts 544, having the elongated cylindrical roller 543 at the upper series 72 mounted thereon, has a sprocket wheel 561 fixed thereon (Figures 3, 4, 21 and 22), and all the sprocket wheels 561 are engaged by a common endless sprocket chain 562. Chain tensioning sprocket wheels 563, 564 engage the respective chains 558, 562 and may be adjustably secured to the lower rail 521 and the upper rail 550' respectively.

As best shown in Figure 6, the compression-unit-supporting frame members 525 and 526 are suitably secured at opposite ends thereof to the frame members 290, 291 and a pair of upright frame members 566, 566', respectively. It will be observed in Figures 3 and 5 that corresponding ends of the outermost of the lower and upper shafts 541 and 544 (on which respective rollers 540, 543 are mounted) extend outwardly through the upright frame member 566 and have respective sprocket wheels 570, 571 fixed thereon which are engaged by an endless sprocket chain 572 (Figure 8). The sprocket chain 572 is also entrained over an idler sprocket wheel 573 journaled on an arm 574 pivotally mounted on the upright member 566 and normally being urged upwardly by a tension spring 575. It should be noted that the chain 572 is so arranged in Figure 5 as to cause the outermost of the shafts 544 to rotate in the opposite direction from the outermost of the shafts 541.

The outermost shaft 541 also has a sprocket wheel 580 fixed thereon which is engaged by an endless sprocket chain 581. The endless sprocket chain engages a driven sprocket wheel 582 fixed on an output shaft 583 (Figures 5 and 8) of a gear-reduction unit 584. The gear-reduction unit 584 has a pulley 585 mounted on the input shaft thereof about which an endless V-belt 586 is entrained. Belt 586 also engages a suitable variable-speed or variable-pitch pulley 587 of the type having spring-loaded expansible flanges or cones thereon, this type of pulley being well-known and a detailed description thereof thus being deemed unnecessary.

The pulley 587 is fixed on the shaft of an electric motor 590 mounted on a base 591. The base 591 is adjustable upon one or more horizontal guide bars 592 by means of a threaded shaft 593. This threaded shaft 593 threadably penetrates the base 591 and is journaled in end bars 598 of the variable-speed unit. The shaft 593 has a suitable hand-wheel 594 thereon to facilitate manual adjustment of the motor 590 and pulley 587 toward and away from the pulley 585 and the gear-reduction unit 584. It is apparent that this will vary the output speed of the gear-reduction unit 584 and correspondingly vary the speed of those rolls of the series 72 and 73 which are driven in zone Y through the intervening connections heretofore described.

The motor support or variable-speed unit and gear-reduction unit 584 are mounted upon a plate 595 whose outer portion is supported between the upright frame members 566, 566' and whose inner portion is supported by upright frame members 596, 596' (Figures 5 and 6).

A suitable cover or enclosure 600 may be provided which is open at opposite ends thereof and encloses the roll series 72, 73 and corresponding portions of the frame work therein. It will be observed in Figures 5, 6 and 8 that the enclosure 600 is of substantially inverted U-shaped form with its outer end portion being suitably secured to the upright frame members 566, 566' and a bridging member 601 extending between and being suitably secured to the upper ends of the frame members 566, 566'. The inner portion of the enclosure 600 is fixed to an inverted substantially U-shaped support 602 whose leg portions are suitably secured to the lower frame members or rails 521, 521'.

It is thus seen that I have provided a novel carton-forming and closing means and method wherein cartons are formed from blanks so each has a distended flap thereon, with means for imprinting adhesive upon the flap and then folding the end and side flaps of the carton in overlapping relationship, with means for ejecting each successive carton from the main conveyor, and wherein novel means are provided for applying pressure to the completed carton while maintaining the walls thereof perpendicular to each other and perpendicular to the bottom of the carton.

It is apparent that all the above operations occur simultaneously on different cartons and the particular arrangement of all the parts of the present apparatus is such as to facilitate a high rate of production as compared to that of machines of this character in use heretofore and wherein the apparatus may operate for long and continuous periods of time without the necessity of stopping the machine at frequent intervals for repairing or adjusting the same, as has heretofore been necessary in machines of this general character.

In the drawings and specification there has been set forth a preferred embodiment of the invention and, although specific terms are employed, they are used in a generic and description sense only and not for purposes of limitation, the scope of the invention being defined in the claims.

We claim:

1. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton, in the course of its movement from the first folding station to the second folding station, for rendering adhesive one of the side flaps of said carton, means at the second folding station for folding the other side flap and the end flaps of the carton inwardly so they overlie the bottom of the carton, means for folding the adhesive side flap over the other flaps of the carton, and said compression unit comprising upper and lower spaced elements between which each successive carton passes while said elements apply pressure to the upper and lower surfaces of corresponding cartons.

2. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton in the course of its movement from the first folding station to the second folding station for applying adhesive to one of the side flaps of said carton, means at the second folding station for folding the other side flap and the end flaps of the carton inwardly so they overlie the bottom of the carton, means for folding the side flap to which adhesive has been applied over the other flaps of the carton, said compression unit comprising upper and lower spaced elements between which each successive carton passes, and at least a portion of the proximal surfaces of the upper and lower elements being movable with corresponding cartons while applying pressure to the upper and lower surfaces of corresponding cartons.

3. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton in the course of its movement from the first folding station to the second folding station for applying adhesive to one of the side flaps of said carton, means at the second folding station for folding the other side flap and the ends flaps of the carton inwardly so they overlie the bottom of the carton, means for folding the side flap to which adhesive has been applied over the other flaps of the carton, and said compression unit comprising upper and lower spaced elements between which each successive carton passes under pressure.

4. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means for rendering adhesive one of the side flaps of said carton, means at the second folding station for folding the other side flap and the end flaps of the carton inwardly so they overlie the bottom of the carton, means for folding the adhesive side flap over the other flaps of the carton, said compression unit comprising upper and lower spaced elements between which each successive carton passes, and at least a portion of the proximal surfaces of the upper and lower elements being movable with corresponding cartons while applying pressure to the upper and lower surfaces of corresponding cartons.

5. A machine for forming cartons from flat blanks comprising a pre-forming station, means to feed blanks, one at a time, to said pre-forming station, said pre-forming station including means to form each successive blank into a carton having a bottom with opposed upwardly extending end flaps and opposed side flaps, means for advancing each successive carton thus formed from the pre-forming station, means to distend one of the side flaps of said carton outwardly in substantially horizontal position, means under control of each successive carton to apply an adhesive upon said distended flap, means to fold the other flaps of the carton inwardly so they overlie the bottom of the carton, means to then fold the side flap having the adhesive thereon over the other flaps, a compression unit comprising spaced upper and lower pressure applying elements for receiving therebetween each successive carton, at least some of the elements being in the form of rollers, the upper and lower elements being so spaced as to apply pressure to the upper and lower surfaces of each successive carton, and means to advance carton through the compression unit.

6. A machine for forming cartons from flat blanks comprising a pre-forming station, means to feed blanks, one at a time, to said pre-forming station, said pre-forming station including means to form the blanks into a carton having a bottom with opposed upwardly extending end flaps and opposed side flaps, a conveyor for receiving each successive carton as it is formed from the pre-forming station, means to distend one of the side flaps of said carton outwardly relative to the conveyor, in substantially horizontal position, means to apply an adhesive upon said distended flap in any predetermined pattern, means to fold the other side flap and the end flaps of the carton inwardly so they overlie the bottom of the carton, means to then fold the side flap having the adhesive thereon over the other flaps, means to eject each successive carton from the conveyor, a compression unit comprising spaced upper and lower rollers for receiving therebetween each successive carton as it is ejected by said ejecting means, said rollers being so spaced as to apply pressure to the upper and lower surfaces of each successive carton, and means to drive at least some of the rollers to advance cartons through the compression unit.

7. A machine for forming cartons from flat blanks comprising a pre-forming station, means to feed blanks, one at a time, to said pre-forming station, said pre-forming station including means to form each successive blank into a carton having a bottom with opposed upwardly extending side flaps, means for advancing each successive carton thus formed from the pre-forming station, means to distend one of the side flaps of said carton outwardly in substantially horizontal position, means under control of each successive carton to apply an adhesive upon said distended flap, means to fold the other flap of the carton inwardly so it overlies the bottom of the carton, and means to then fold the side flap having the adhesive thereon over the other flap.

8. A machine for forming cartons from flat blanks comprising a pre-forming station, means to feed blanks, one at a time, to said pre-forming station, said blank feeding means including at least one constantly driven pliable element having spaced lugs thereon, means for transferring blanks from a stack of blanks to said element whereby the lugs on the element engage and feed each successive blank to the pre-forming station, said pre-forming station including means to form each successive blank into a carton having a bottom with opposed upwardly extending end flaps and opposed upwardly extending side flaps, means for advancing each successive carton thus formed from the pre-forming station, means to distend one of the side flaps of said carton outwardly in substantially horizontal position, means under control of each successive carton to apply an adhesive upon said distended flap, means to fold the other flaps of the carton inwardly so they overlie the bottom of the carton, means to then fold the side flap having the adhesive thereon over the other flaps, a compression unit for receiving therebetween each successive carton and for applying pressure to the upper and lower surfaces thereof, and means to advance cartons through the compression unit.

9. For use with a carton forming machine; means to feed flat blanks to a folding station comprising a platform for supporting a stack of blanks, a grasping device disposed above the stack, means operable in timed relation to said machine for actuating the grasping device to move the same downwardly against the stack, upwardly and then forwardly, driven feed rollers for receiving the leading edge of each successive blank from the grasping device and projecting the corresponding blank forwardly, and at least one driven endless blank feeding element disposed between the folding station and said feed rollers and having spaced lugs thereon for engaging the trailing edge of each successive blank and advancing the same to the folding station.

10. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, said blank feeding means comprising a platform for supporting a stack of blanks, a grasping device disposed above the stack, means for actuating the grasping device to repeatedly move the same downwardly against the stack, upwardly and then forwardly, driven feed rollers for receiving the leading edge of each successive blank from the grasping device and projecting the corresponding blank forwardly, driven endless blank feeding elements disposed forwardly of said feed rollers and having spaced lugs thereon for engaging the rear edge of each successive blank and advancing the same to the first folding station, means to advance each successive carton thus formed from the first folding station past a second folding station and to a compression unit, means under control of each successive carton in the course of its movement from the first folding station to the second folding station for rendering adhesive one of the side flaps of said carton, means at the second folding station for folding the other side flap and the end flaps of the carton inwardly so they overlie the bottom of the carton, and means for folding the adhesive side flap over the other flaps of the carton, said compression unit receiving each successive carton and applying pressure to the upper and lower surfaces thereof.

11. A machine for forming cartons from flat substantially cross-shaped blanks comprising a first folding station, means to feed blanks, one at a time, to said first folding station, said first folding station comprising a normally elevated punch, a substantially rectangular tubular die alined with the punch and upon which each successive blank is positioned, means to lower and raise the punch to form each successive blank into a carton having a bottom with opposed end flaps and opposed side flaps projecting upwardly therefrom, means having pockets thereon for receiving and advancing each successive carton thus formed from the first folding station past a second folding station and to a compression unit, means under control of each successive carton in the course of its movement from the first folding station to the second folding station for applying adhesive to one of the side flaps of said carton, means at the second folding station for folding the other side flap and the end flaps of the carton inwardly so they overlie the bottom of the carton, and means for folding the side flap to which adhesive has been applied over and against the other flaps of the carton, said compression unit receiving each successive carton and applying pressure to the upper and lower surfaces thereof.

12. For use with a carton forming machine of the character described; a folding station comprising a normally elevated punch, a substantially rectangular tubular die below said punch, said die being adapted to support flat blanks thereon, one at a time, said die being open at its lower end, carton advancing means extending closely beneath said die and having pockets thereon for receiving each successive carton, means to move the punch downwardly and then upwardly to force each successive blank through the die and into a corresponding pocket to form a carton having a bottom and upwardly projecting side and end flaps thereon, the lower portions of side walls of said die being recessed at their inner surfaces to form shoulders thereon beneath which corresponding side flaps of each successive carton are positioned whereby the cartons are stripped from the punch with each upward stroke of the punch, side rails extending along beside the pockets of the conveyor and between which said pockets move, and the recess in one of the side walls of said die being so positioned as to cause said one of the side flaps of said carton to pass outwardly of the corresponding side rail.

13. For use with a carton forming machine of the character described; a folding station comprising a normally elevated punch, a substantially rectangular tubular die below said punch, said die being adapted to support flat blanks thereon, one at a time, said die being open at its lower end, carton advancing means extending closely beneath said die and having pockets thereon for receiving each successive carton, means to move the punch downwardly and then upwardly to force each successive blank through the die and into a corresponding pocket to form a carton having a bottom and upwardly projecting side and end flaps thereon, the lower portions of side walls of said die being recessed at their inner surfaces to form shoulders thereon beneath which corresponding side flaps of each successive carton are positioned whereby the cartons are stripped from the punch with each upward stroke of the punch, means movable with said punch for forcing the corresponding flap of each successive carton into the recess formed in a corresponding wall of said die during the course of each active stroke of the punch, side rails extending along beside the pockets of the conveyor and between which said pockets move, and the recess in one of the side walls of said die being so positioned as to cause said one of the side flaps of said carton to pass outwardly of the corresponding side rail.

14. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom and including a normally elevated punch, a substantially rectangular tubular die below said punch and upon which each successive blank is positioned by the blank feeding means, said die being open at its lower end, means to advance each successive carton thus formed from the first folding station past a second folding station and to a compression unit, said advancing means extending closely beneath said die and having pockets thereon for receiving each successive carton, means to move the punch downwardly to force each successive carton into a corresponding pocket, the lower portions of side walls of said die being recessed at their inner surfaces to form shoulders thereon beneath which corresponding side flaps of each successive carton are positioned whereby the cartons are stripped from the punch with each upward stroke of the punch, means under control of each successive carton in the course of its movement from the first folding station to the second folding station for rendering adhesive one of the side flaps of said carton, means at the second folding station for folding the other side flap and the end flaps of the carton inwardly so they overlie the bottom of the carton, and means for folding the adhesive side flap over the other flaps of the carton, said compression unit receiving each successive carton and applying pressure to the upper and lower surfaces thereof.

15. A machine for forming cartons from flat blanks comprising a pre-forming station, means to feed blanks, one at a time, to said pre-forming station, said pre-forming station including means to form each successive blank into a carton having a bottom with opposed upwardly extending end flaps and opposed side flaps, means for advancing each successive carton thus formed from the pre-forming station, side rails extending forwardly from said station adjacent opposite sides of said advancing means, means automatically operable as each successive carton is formed at the pre-forming station to cause one of the side flaps to project outwardly of the longitudinal plane of the corresponding side rail, means to distend said one of the side flaps of said carton outwardly in substantially horizontal position including a downwardly and outwardly curving cam element carried by the last-mentioned side rail, a plate member disposed immediately beneath the cam element and downwardly against which said one of the side flaps is distended by the cam element, means under control of each successive carton to render said distended flap adhesive, means to fold the other flaps of the carton inwardly so they overlie the bottom of the carton, means to then fold the adhesive side flap over the other flaps, and a compression unit for receiving cartons therebetween and applying pressure to each successive carton.

16. A machine for forming cartons from flat blanks comprising a pre-forming station, means to feed blanks, one at a time, to said pre-forming station, said pre-forming station including means to form each successive blank into a carton having a bottom with opposed upwardly extending side flaps, means for advancing each successive carton thus formed from the pre-forming station, means to distend one of the side flaps of said carton outwardly in substantially horizontal position, a platen normally spaced adjacent and above the level of the path of said cartons, means to apply a liquid adhesive to said platen, means under control of each successive carton to lower said platen momentarily to apply adhesive upon said distended flap, means to fold the other flap of the carton inwardly so it overlies the bottom of the carton, means to then fold the side flap having the adhesive thereon over the other flap, a compression unit for receiving therebetween each successive carton and to apply pressure to the upper and lower surfaces of each successive carton, and means to advance cartons through the compression unit.

17. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, a platen normally spaced above the level of the path of the advancing means, means to apply a film of liquid adhesive to said platen, means under control of each successive carton, in the course of its movement from the first folding station to the second folding station, for lowering said platen momentarily for applying adhesive to one of the side flaps of said carton, means at the second folding station for folding the other side flap and the end flaps of the carton inwardly so they overlie the bottom of the carton, and means for folding the side flap to which adhesive has been applied over the other flaps of the carton, said compression unit receiving each successive carton and applying pressure to the upper and lower surfaces thereof.

18. Adhesive applying means for applying adhesive to flaps of successive cartons as they are formed on a carton forming machine having means to advance the cartons while distending outwardly a flap of each successive carton, said applying means comprising a platen normally disposed above the level of a corresponding distended flap and to one side thereof, said platen being provided with rib means of predetermined configuration on its lower surface, means automatically operable upon each successive flap moving to a position adjacent said platen for imparting an active inward stroke to the platen and to then permit the platen to move downwardly into engagement with the corresponding distended side flap and to then return the platen to its original position, and means automatically operable in the course of certain strokes of said platen for applying a film of adhesive to the rib means on the platen whereby the adhesive is subsequently imprinted upon the corresponding distended flap.

19. For applying adhesive to a flap of each of a plurality of moving partially formed cartons; a platen normally disposed above the level of each successive flap and to one side thereof, said platen being provided with rib means of predetermined configuration on its lower surface, means under control of each successive flap for momentarily effecting an active inward and then a downward stroke to the platen so the platen rib means moves downwardly into engagement with the corresponding flap, and means automatically operable in the course of certain strokes of said platen for applying a film of adhesive to the rib means on the platen whereby adhesive is subsequently imprinted upon the corresponding flap.

20. Apparatus for applying adhesive to a flap of each of a plurality of partially formed cartons wherein a conveyor is used for intermittently advancing cartons to and past the apparatus, said apparatus comprising a platen having at least one rib on its lower surface and normally spaced above the level of said conveyor, means for applying liquid adhesive to the lower surface of said rib, means to distend the flap of each successive carton outwardly to a substantially horizontal position as it approaches the apparatus, and means automatically operable in timed relation to the movement of said conveyor for lowering said platen to cause the rib thereon to engage and imprint adhesive upon the corresponding distended flap, said lowering means being operable to return the platen to raised position.

21. Apparatus for applying adhesive to a flap of each of a plurality of partially formed cartons wherein a conveyor is used for intermittently advancing cartons to and past the apparatus, said apparatus comprising a substantially horizontal platen having at least one projection on its lower surface and normally being spaced above the level of said conveyor, means for applying a film of liquid adhesive to said projection, a carriage guided for substantially horizontal inward and outward movement above and relative to said conveyor, a support element mounted for substantially vertical movement in said carriage and to which said platen is attached, means operable in timed relation to the movement of said conveyor for imparting active inward and inactive outward strokes to said carriage, retaining means to maintain said support element in raised position and thereby maintain the platen in said normal position during inward and outward movement of said carriage, means automatically operable for releasing said support element from the retaining means at the end of certain active strokes of said carriage whereby the support element and platen move downwardly, by gravity, to imprint adhesive upon the corresponding flaps, and means to then actuate said retaining means for returning the support element and platen to said normal position.

22. Apparatus for applying adhesive to a flap of each of a plurality of partially formed cartons wherein a conveyor is used for intermittently advancing successive cartons to and past the apparatus, said apparatus comprising means to distend a flap of each successive carton outwardly to substantially horizontal position relative to the conveyor, a carriage mounted for substantially horizontal reciprocation above the level of said conveyor, a support element guided for vertical movement in said carriage, a platen carried by said support element and having at least one rib on its lower surface, first and second follower means on said support element, a fixed track and a movable track engageable by the respective first and second follower means, means operable in timed relation to the movement of said conveyor for repeatedly imparting active and inactive strokes to said carriage, said first follower means being moved beyond said fixed track at the end of each active stroke of said carriage while the movable track remains in engagement with said second follower means, means under control of each successive carton for momentarily lowering and then raising said movable track whereby the support element and platen move downwardly at the end of an active stroke of said carriage so the rib engages and imprints adhesive upon the corresponding flap, and means for effecting a film of liquid adhesive on the lower surface of the rib.

23. Apparatus for applying adhesive to a flap of each of a plurality of partially formed cartons wherein a conveyor is used for successively advancing cartons to and past the apparatus, said apparatus comprising means to distend a flap of each successive carton outwardly to a substantially horizontal position relative to the conveyor, a carriage mounted for substantially horizontal reciprocation above the level of said conveyor, a support element guided for vertical movement in said carriage, a platen carried by said support element and having at least one rib on its lower surface, first and second follower means on said support element, a fixed track and a movable track engageable by the respective first and second follower means, means operable in timed relation to the movement of said conveyor for repeatedly imparting active and inactive strokes to said carriage, said first follower means being moved beyond said fixed track at the end of each active stroke of said carriage while the movable track remains in engagement with said second follower means, means responsive to the positioning of a flap adjacent said apparatus for momentarily lowering and then raising said movable track whereby the support element and platen move downwardly at the end of an active stroke of said carriage so the rib engages and imprints adhesive upon the corresponding flap, and means engageable by the rib in the course of at least some of the strokes of said carriage for applying a film of liquid adhesive to the lower surface of the rib.

24. A structure according to claim 23 wherein said means for applying a film of liquid adhesive to said rib comprises an adhesive transferring roll against which said rib passes in the course of certain strokes thereof, a reservoir containing a supply of liquid adhesive, and a pick-up roll engaging the adhesive in said reservoir and engaging said transferring roll.

25. A structure according to claim 23 wherein the means for lowering and raising said movable track includes a cam driven constantly in timed relation to the conveyor, a third follower means engageable with said cam, mechanical connection between said follower means and said movable track and including a rigid member movable with said third follower means, means resiliently urging said member in a direction to normally urge the third follower means into engagement with said cam, latch means normally restraining said member from movement under pressure of the resilient means when a high surface of the cam moves out of engagement with the third follower means and thereby normally maintaining the movable track in raised position, and said means responsive to the positioning of a flap including means for releasing said latch means to permit said member to be urged in said direction by said resilient means as a high surface of the cam moves out of engagement with the third follower means to lower said movable track.

26. A structure according to claim 24 wherein said raising and lowering means includes means to raise said movable track to where the rib clears the transferring roll with each stroke thereof other than active strokes of the carriage occurring upon said responsive means being activated.

27. A structure according to claim 25 in which said responsive means includes a switch engageable by the flap of each successive carton, and electrically operable means for releasing the restraining means upon engagement of said switch by a flap on a corresponding carton.

28. A structure according to claim 25 wherein said means for applying a film of liquid adhesive to said rib comprises an adhesive transferring roll against which said rib passes in the course of certain strokes thereof, a reservoir containing a supply of liquid adhesive, and a pick-up roll engaging the adhesive in said reservoir and engaging said transferring roll.

29. A structure according to claim 28 wherein said cam is so formed as to raise the movable track to where the rib clears the adhesive transferring roll with each stroke thereof other than active strokes occurring while said latch means is released.

30. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton, in the course of its movement from the first folding station to the second folding station for rendering adhesive one of the side flaps of said carton, means at the second folding station for folding the other side flap and the end flaps of the carton inwardly so they overlie the bottom of the carton comprising a pair of rotating cams located above the path of travel of said cartons, a plate forwardly of the cams for engaging and folding the leading end flap of each carton, one of said cams engaging said other side flap and folding the same inwardly before said leading end flap passes beneath said plate, the other cam engaging and folding forwardly the trailing end flap of each carton, and means for folding the adhesive side flap over the other flaps of the carton, means to transfer successive cartons from the advancing means to the compression unit, said compression unit receiving each successive carton and applying pressure to the upper and lower surfaces thereof.

31. Apparatus for folding inwardly opposed end flaps and a side flap of successive partially formed cartons as they are advanced in the pockets of a conveyor comprising a rotating shaft driven in timed relation to said conveyor, said shaft being spaced above and extending transversely of the path of travel of the conveyor, first and second cams fixed on said shaft, a plate overlying the conveyor closely above the level of the pockets and having an upwardly curved rear end disposed forwardly of the vertical plane of the shaft with respect to the direction of the movement of the conveyor, means disposed rearwardly of said cams for deflecting said side flap inwardly, said first cam being so arranged as to engage the side flap so deflected and to move the same downwardly to overlie the bottom of the corresponding carton as it is advanced by the conveyor, said plate serving to fold the leading end flap of each successive carton downwardly to overlie the forward end of the side flap and the bottom of the corresponding carton, and said second cam being so arranged as to engage and move the trailing end flap of the corresponding carton forwardly to overlie the rear end of the corresponding side flap and the bottom of the carton, whereby said plate then maintains the side flaps and the end flap in the folded position.

32. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton, in the course of its movement from the first folding station to the second folding station, for rendering adhesive one of the side flaps of said carton, means at the second folding station for folding the other side flap and the end flaps of the carton inwardly so they overlie the bottom of the carton, means for folding the adhesive side flap over the other flaps of the carton, said compression unit comprising upper and lower spaced elements and laterally spaced side wall-compacting elements between which each successive carton passes, and at least a portion of the carton-engaging surfaces of the elements being movable with corresponding cartons while applying pressure to the cartons.

33. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton, in the course of its movement from the first folding station to the second folding station, for rendering adhesive one of the side flaps of said carton, means at the second folding station for folding the other side flap and the end flaps of the carton inwardly so they overlie the bottom of the carton, said compression unit comprising upper and lower spaced elements between which each successive carton passes, at least a portion of the proximal surfaces of the upper and lower elements being movable with corresponding cartons while applying pressure to the upper and lower surfaces of corresponding cartons, and means to eject successive cartons from the advancing means with the outer surface of the adhesive side flap engaging adjacent upper elements whereby the side flap which has been rendered adhesive is folded over the other flaps of the carton.

34. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means under control of each successive carton, in the course of its movement from the first folding station to the second folding station, for applying adhesive to one of the side flaps of said carton, means at the second folding station for folding the other side flap and the end flaps of the carton inwardly so they overlie the bottom of the carton, said compression unit comprising upper and lower spaced elements between which each successive carton passes, at least some of the upper and lower elements being in the form of rollers rotatable in engagement with corresponding cartons while applying pressure to the upper and lower surfaces of corresponding cartons, and means for folding the side flap to which adhesive has been applied over the other flaps of the carton as each successive carton enters between said upper and lower elements.

35. A machine for forming cartons from flat substantially cross-shaped blanks comprising a first folding station, means to feed blanks, one at a time, to said first folding station, said first folding station comprising means to form each successive blank into a carton having a bottom with opposed end flaps and opposed side flaps projecting upwardly therefrom, means to advance each successive carton thus formed from the first folding station past a second folding station and to a compression unit, means to render adhesive one of the side flaps of said carton, means at the second folding station for folding the other side flap and the end flaps of the carton inwardly so they overlie the bottom of the carton, means to eject each successive carton from the advancing means laterally thereof with the adhesive side flap leading, said compression unit comprising upper and lower spaced rollers between which each successive carton passes to thereby fold the side flap which has been rendered adhesive over the other flaps of the carton, and the proximal surfaces of the upper and lower rollers being movable with corresponding cartons while applying pressure to the upper and lower surfaces thereof.

36. Apparatus for applying pressure to cartons, boxes and the like comprising first and second series of parallel closely spaced rollers, the first series being spaced from the second series a distance equal to the desired thickness of a finished carton, side guiding elements extending longitudinally of the series with at least portions thereof being disposed in planes between the planes of the proximal surfaces of the first and second series of rollers, said series each including a plurality of idler rollers complementary to a plurality of idler rollers of the other series, said idler rollers extending through an expanse at least greater than the width of each successive carton positioned therebetween whereby each successive carton may engage and advance the preceding carton while compacting the proximal edges of preceding and succeeding cartons to render the same perpendicular to the ends of the cartons, and each series of rollers including a zone subsequent to the said idler rollers in which at least some of the rollers are driven to thereby advance each successive carton through the latter zone away from the immediately succeeding carton.

37. A structure according to claim 36 having means for varying the speed at which said some of the rollers are driven.

38. A structure according to claim 36 having means to adjust either of said series of rollers relative to the other to insure that cartons are tightly compressed therebetween.

39. A structure according to claim 36 having means to adjust the side guiding elements to vary the displacement therebetween for tightly engaging opposite ends of cartons.

40. A compression unit for applying pressure to substantially rectangular cartons as they are formed from blanks on a carton forming machine and wherein said machine has a conveyor for advancing successive cartons to the compression unit, said compression unit comprising a first series of parallel bottom rolls, a second series of parallel top rolls spaced above the bottom rolls a distance equal to the desired height of the finished cartons, said series extending outwardly substantially laterally of the path of travel of the conveyor, said rolls including an ingress zone of idler rolls disposed adjacent the conveyor and an egress zone of rolls remote from the conveyor, at least some of which are driven, means operable in timed relation to the conveyor for transferring each successive carton from the conveyor to a position between the rolls in said ingress zone, said ingress zone being of sufficient length to require that a carton positioned therein be advanced by a succeeding carton as it is transferred from the conveyor to cause the interengaging surfaces of adjacent cartons to occupy perpendicular relationship with respect to the bottom, and end, surfaces of the cartons, and the driven rolls in the egress zone serving to move each successive carton away from the next succeeding carton while advancing the same through the compression unit and applying pressure to the upper and lower surfaces of the corresponding cartons.

41. A structure according to claim 40 wherein each of certain rolls in each of said series is in the form of a plurality of axially alined relatively narrow discs having flat peripheral surfaces thereon and others of said rolls in either series are each in the form of an elongated cylindrical member of an axial length at least equal to the width of corresponding cartons.

42. A structure according to claim 40 having laterally spaced guide elements extending longitudinally of and between the planes of the first and second series of rolls and being so spaced as to engage opposite ends of each successive carton for applying pressure thereto.

43. A structure according to claim 40 wherein a pair of rows of substantially parallel end-compacting rolls are positioned between the planes of the proximal surfaces of said first and second series of rolls, and the compacting rolls being so spaced as to engage and rotate in engagement with opposite ends of each carton as it passes through the compression unit.

44. A structure according to claim 42 wherein the proximal surfaces of said guide elements move, at least in part, in engagement with opposed ends of corresponding cartons while applying pressure thereto.

45. A structure according to claim 43 having means for varying the speed of said driven rolls, means to adjust at least one of said series of rolls relative to the other to vary the displacement between the first and second series of rolls to insure that cartons are tightly compressed therebetween, and means to vary the displacement between the rows of rolls at opposite sides of the compression unit to insure that the compacting rolls tightly engage opposite ends of the cartons passing through the compression unit.

46. That method of forming a closed container from a flat blank having a rectangular bottom and first and second opposed side flaps and first and second opposed end flaps projecting outwardly from the four edges of said bottom which comprises forcing the blank through a rectangular tubular die to cause the side flaps and end flaps to project upwardly from said bottom, positioning the container thus formed in a rectangular pocket for maintaining the upright position of said side and end flaps relative to said bottom, rendering adhesive at least a portion of the first side flap, successively folding the second side flap and then the first and the second end flaps inwardly to overlie the bottom, and then folding the first side flap over the other flaps.

47. A method of forming a carton from a flat blank having a rectangular bottom with first and second end flaps and first and second side flaps projecting outwardly from the four edges of said bottom which comprises forcing the blanks downwardly through a rectangular tubular die to cause the side and end flaps to project upwardly from the said bottom, positioning the carton thus formed in rectangular pockets for maintaining the side and end flaps in upright position, advancing the cartons in said pockets, moving the first side flap outwardly to a substantially horizontal position during advancment of the carton, actuating an adhesive applying apparatus in response to the latter side flap being thus positioned, moving a platen to which liquid adhesive has been applied downwardly against the latter flap in response to outward movement of said flap for rendering said latter flap adhesive, then folding inwardly the second side flap, then successively folding inwardly the first and second end flaps, then folding the first side flap over the other flaps, and then subjecting the upper and lower surfaces of the carton thus formed to pressure by moving the cartons in engagement with pressure applying surfaces movable with the carton.

48. A method of forming cartons from flat blanks each having a rectangular bottom with first and second end flaps and first and second side flaps projecting outwardly from the four edges of said bottom which comprises forcing the blanks downwardly through a rectangular tubular die to cause the side and end flaps to project upwardly from the said bottom, positioning the cartons thus formed in rectangular pockets for maintaining the side and end flaps in upright position, advancing the cartons in said pockets, moving the first side flap outwardly to a substantially horizontal position during advancement of the carton, moving a platen to which liquid adhesive has been applied downwardly against the first flap in response to outward movement of said flap for rendering the first flap adhesive, then folding inwardly the second side flap, then successively folding inwardly the first and second end flaps, and then folding the first side flap over the other flap.

49. A method of forming a carton from a flat blank having a rectangular bottom with first and second end flaps and first and second side flaps projecting outwardly from the four edges of said bottom which comprises forcing the blank downwardly through a rectangular tubular die to cause the side and end flaps to project upwardly from the said bottom, positioning the carton thus formed in a rectangular pocket for maintaining the side and end flaps in upright position, advancing the carton in said pocket, moving the first side flap outwardly to a substantially horizontal position during advancement of the carton, moving a platen to which liquid adhesive has been applied downwardly against the first flap in response to outward movement of said flap for rendering the first flap adhesive, then folding inwardly the second side flap, then successively folding inwardly the first and second end flaps, then folding the first side flap over the other flaps, and then subjecting the upper and lower, and end, surfaces of the carton thus formed to pressure by moving the carton in engagement with pressure applying rolls rotatable with the carton.

50. A method of forming cartons from flat blanks each having a rectangular bottom with first and second end flaps and first and second side flaps projecting outwardly from the four edges of said bottom which comprises forcing such blanks through a rectangular tubular die to cause the side and end flaps to project upwardly from the said bottom, advancing the cartons thus formed, moving the first side flap outwardly to a substantially horizontal position during advancement of the carton, moving a platen having liquid adhesive thereon downwardly against the first flap in response to outward movement of said first flap for rendering said first flap adhesive, then folding inwardly the second side flap, then successively folding inwardly the first and second end flaps, then folding the first end flap over the other flaps, and then moving the cartons between pressure applying rollers engaging opposite ends and upper and lower surfaces of the cartons to seal the same.

51. A method of forming cartons from flat blanks each having a rectangular bottom with first and second end flaps and first and second side flaps projecting outwardly from the four edges of said bottom which comprises forcing such blanks through a rectangular tubular die to cause the side and end flaps to project upwardly from the said bottom, advancing the cartons thus formed, moving the first side flap outwardly to a substantially horizontal position during advancement of the carton, moving a platen having liquid adhesive thereon downwardly against the first flap in response to outward movement of said first flap for rendering said first flap adhesive, then folding inwardly the second side flap, then successively folding inwardly the first and second end flaps, then folding the first end flap over the other flaps, then moving the cartons between groups of pressure applying idler rolls engaging upper and lower surfaces of cartons, and then moving the cartons between groups of pressure applying rollers, at least some of which are driven, for advancing cartons away from succeeding cartons.

52. A method of forming a carton from a flat blank having a rectangular bottom with first and second end flaps and first and second side flaps projecting outwardly from the four edges of the said bottom which comprises forcing the blanks downwardly through a rectangular tubular die to cause the side and end flaps to project upwardly from the said bottom, positioning cartons thus formed in rectangular pockets for maintaining the side and end flaps in upright position, advancing the cartons in said pockets, moving the first side flap outwardly to a substantially horizontal position during advancement of each carton, moving a platen to which liquid adhesive has been applied downwardly against the first flap in response to outward movement of said first flap for rendering the said first flap adhesive, then deflecting the second side flap inwardly, then moving an elevent into engagement wtih the second side flap to lay the same in substantially parallel and overlying position relative to the bottom of the carton, then passing the carton beneath a plate for folding the leading end flap thereof over and against the second side flap, then, as the carton advances, moving a member against the trailing end flap for moving the same inwardly in the same direction in which the carton is moving whereby said second side flap and said end flaps move beneath said plate, and then moving the carton laterally of its original path and between spaced pressure applying elements for folding the adhesive side flap over the other flaps and for applying pressure to the upper and lower surfaces of the carton.

References Cited in the file of this patent

UNITED STATES PATENTS

| Number | Name | Date |
|---|---|---|
| 1,852,451 | Everett | Apr. 5, 1932 |
| 1,916,515 | Kraft | July 4, 1933 |
| 1,955,398 | Werner | Apr. 17, 1934 |
| 1,956,820 | Bergstein | May 1, 1934 |
| 2,050,019 | Rutkowski | Aug. 4, 1936 |
| 2,105,270 | Scheffey | Jan. 11, 1938 |
| 2,125,147 | Bergstein | July 26, 1938 |
| 2,255,251 | Guyer | Sept. 9, 1941 |
| 2,261,018 | Chapman | Oct. 28, 1941 |
| 2,303,513 | Thresh | Dec. 1, 1942 |
| 2,483,063 | Ray | Sept. 27, 1949 |
| 2,508,216 | Bonds et al. | May 16, 1950 |
| 2,592,822 | Rapp et al. | Apr. 15, 1952 |
| 2,714,344 | Baker | Aug. 2, 1955 |
| 2,727,444 | Wethe | Dec. 20, 1955 |
| 2,735,678 | McKay | Feb. 21, 1956 |
| 2,798,416 | Clement | July 9, 1957 |
| 2,804,738 | Shenigo | Sept. 3, 1957 |